United States Patent
Min et al.

(10) Patent No.: US 11,595,233 B2
(45) Date of Patent: Feb. 28, 2023

(54) ELECTRONIC DEVICE SUPPORTING MULI-BAND WIRELESS COMMUNICATIONS AND METHOD OF CONTROLLING SAME

(71) Applicant: SAMSUNG ELECTRONICS CO., LTD., Suwon-si (KR)

(72) Inventors: Hyunkee Min, Sangju-si (KR); Yongseok Jang, Suwon-si (KR); Taehun Lim, Gwacheon-si (KR); Minwhoa Hong, Suwon-si (KR); Sunkee Lee, Seongnam-si (KR); Doosuk Kang, Suwon-si (KR); Bokun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/375,090

(22) Filed: Jul. 14, 2021

(65) Prior Publication Data
US 2021/0344525 A1    Nov. 4, 2021

Related U.S. Application Data

(63) Continuation of application No. 16/898,488, filed on Jun. 11, 2020, now Pat. No. 11,070,398, which is a (Continued)

(30) Foreign Application Priority Data

Oct. 19, 2017  (KR) .................. 10-2017-0135718

(51) Int. Cl.
*H04L 25/02*      (2006.01)
*H04L 25/03*      (2006.01)
(Continued)

(52) U.S. Cl.
CPC ....... *H04L 25/0212* (2013.01); *H04B 1/7163* (2013.01); *H04B 7/0617* (2013.01);
(Continued)

(58) Field of Classification Search
CPC .......................... H04W 88/06; H04W 72/0453
See application file for complete search history.

(56) References Cited

U.S. PATENT DOCUMENTS 10,693,682 B2   6/2020   Min et al.
11,070,398 B2   7/2021   Min et al.
(Continued)

FOREIGN PATENT DOCUMENTS

KR   10-2012-0135300       12/2012
KR   10-2014-0021040        2/2014
(Continued)

OTHER PUBLICATIONS

U.S. Appl. No. 16/898,488, filed Jun. 11, 2020; Min et al.
(Continued)

*Primary Examiner* — Kevin Kim
(74) *Attorney, Agent, or Firm* — Nixon & Vanderhye P.C.

(57) ABSTRACT

Disclosed is an electronic device, including a housing, a first communication circuit disposed in the housing and configured to support omnidirectional wireless communication, a second communication circuit disposed in the housing and configured to support directional wireless communication using beamforming, a processor disposed in the housing and operatively coupled to the first communication circuit and the second communication circuit, and a memory disposed in the housing and operatively coupled to the processor. The processor may be configured to receive at least one first radio signal through a communication channel from an external device capable of supporting the omnidirectional wireless communication and the directional wireless com-
(Continued)

munication using the first communication circuit, determine a state of the communication channel based on at least part of the at least one first radio signal, and activate the second communication circuit based on at least part of the determined state of the communication channel wherein the second communication circuit is configured to receive a second radio signal from the external device.

18 Claims, 23 Drawing Sheets

Related U.S. Application Data continuation of application No. 16/162,595, filed on Oct. 17, 2018, now Pat. No. 10,693,682.

(51) Int. Cl.
*H04B 7/06* (2006.01)
*H04B 1/7163* (2011.01)
*H04B 17/318* (2015.01)

(52) U.S. Cl.
CPC ......... *H04B 17/318* (2015.01); *H04L 25/022* (2013.01); *H04L 25/03292* (2013.01)

(56) References Cited

U.S. PATENT DOCUMENTS

| | | |
|---|---|---|
| 2002/0036718 A1 | 3/2002 | Lee |
| 2009/0296839 A1 | 12/2009 | Stadelmeier |
| 2010/0046455 A1 | 2/2010 | Wentink |
| 2011/0182174 A1 | 7/2011 | Pi et al. |
| 2011/0261755 A1 | 10/2011 | Cordeiro et al. |
| 2011/0273999 A1* | 11/2011 | Nagaraja ............... H04L 1/1692 370/252 |
| 2012/0225665 A1 | 9/2012 | Alexander et al. |
| 2012/0327851 A1 | 12/2012 | Wentink et al. |
| 2013/0034045 A1 | 2/2013 | Kwon |
| 2013/0044028 A1 | 2/2013 | Lea et al. |
| 2013/0050021 A1 | 2/2013 | Wang |
| 2014/0148107 A1 | 5/2014 | Maltsev et al. |
| 2014/0243043 A1 | 8/2014 | Shen et al. |
| 2014/0269763 A1 | 9/2014 | Gantman et al. |
| 2014/0320373 A1 | 10/2014 | Kanj |
| 2016/0165619 A1 | 6/2016 | McMilin et al. |
| 2016/0269132 A1 | 9/2016 | Clark |
| 2017/0207530 A1 | 7/2017 | Anderson |
| 2017/0272998 A1 | 9/2017 | Choi et al. |
| 2018/0091201 A1 | 3/2018 | Yang |

FOREIGN PATENT DOCUMENTS

| | | |
|---|---|---|
| KR | 10-2015-0132240 | 11/2015 |
| KR | 10-2017-0091649 | 8/2017 |
| WO | 2013/158237 | 10/2013 |

OTHER PUBLICATIONS

U.S. Appl. No. 16/162,595, filed Oct. 17, 2018; Min et al.
International Search Report dated Jan. 23, 2019 in counterpart International Patent Application No. PCT/KR2018/012293.
Vinko Erceg, "60GHz vs. 5GHz propagation discussion," IEEE 80211-07/2793r0, Nov. 12, 2007.
Extended European Search Report dated Jun. 26, 2020 for European Application No. 18868844.4.
Nurminen et al.,"A NLOS-Robust TOA Positioning Filter Based on a skew-t Measurement Noise Model", 2015 International Conference on Indoor Positioning and Indoor Navigation; Oct. 13-16, 2015; pp. 1-7.
Muqaibel et al., "Practical Evaluation of NLOS/LOS Parametric Classification in UWB Channels", Communications, Signal Processing, and Their Applications (ICCSPA), 2013 1$^{st}$ International Conference on IEEE, Feb. 12, 2013; pp. 1-6.
Korean Office Action dated Jun. 8, 2021 for KR Application No. 10-2017-0135718.

* cited by examiner

FIG. 11A
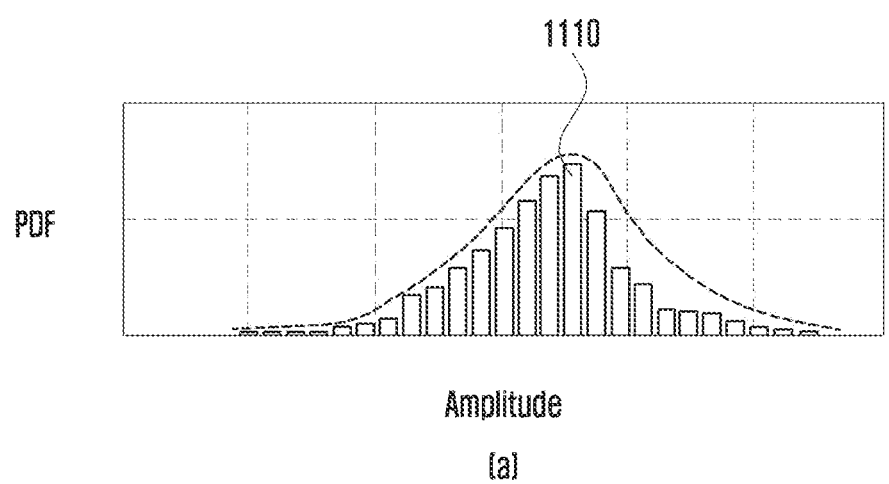
(a)
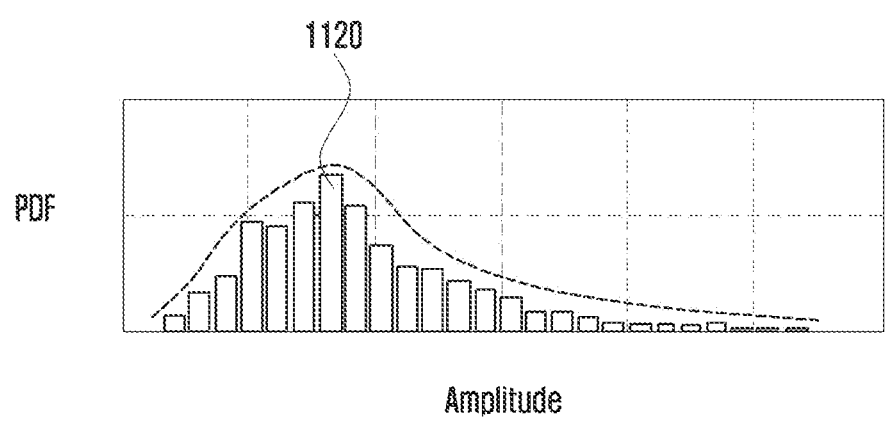
(b)

FIG. 12A
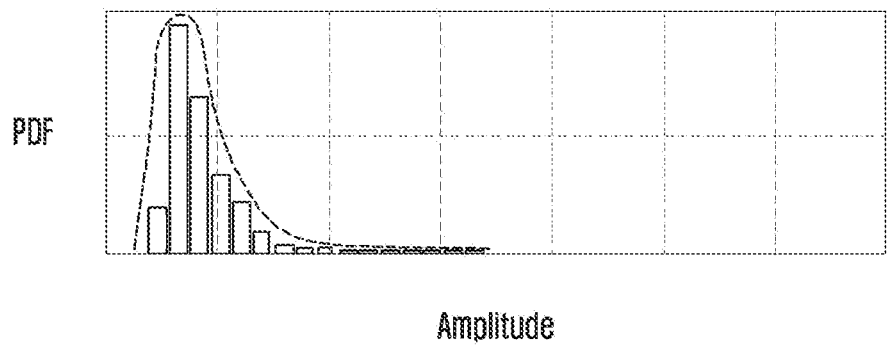
(a)
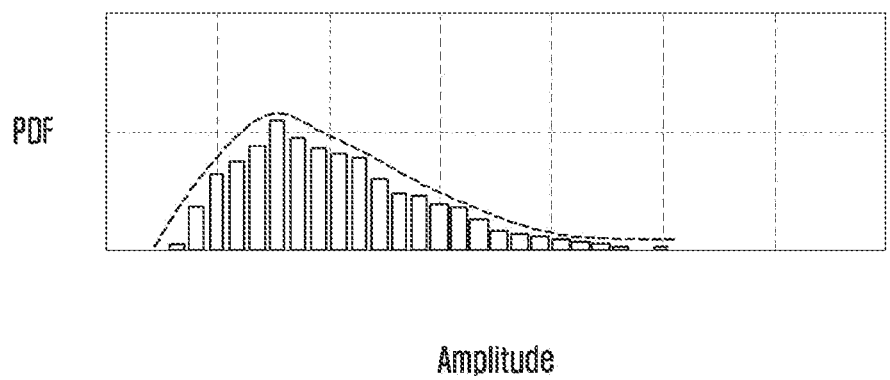
(b)

FIG. 12B
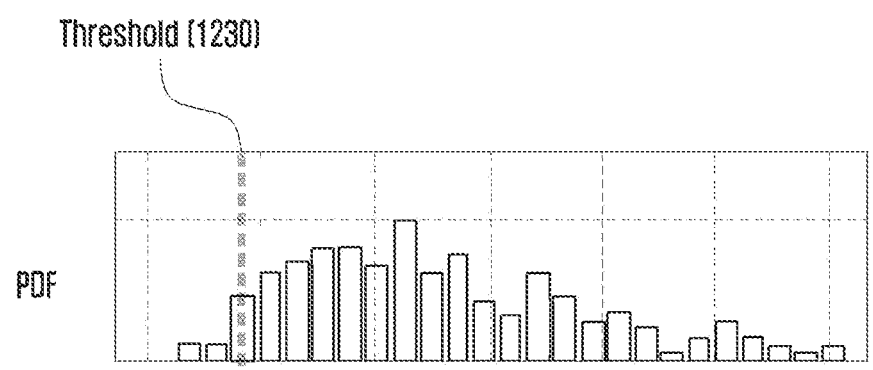
(a)
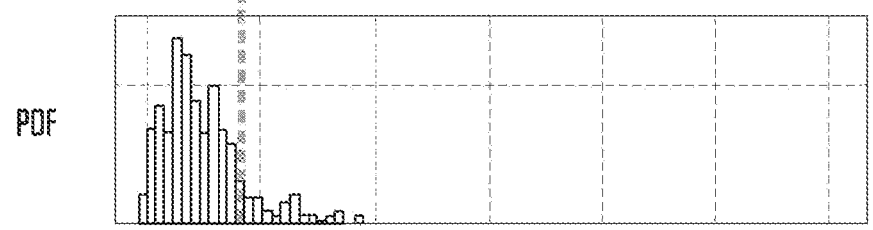
(b)

ELECTRONIC DEVICE SUPPORTING MULI-BAND WIRELESS COMMUNICATIONS AND METHOD OF CONTROLLING SAME

CROSS-REFERENCE TO RELATED APPLICATION

This application is a Continuation of U.S. application Ser. No. 16/898,488, filed Jun. 11, 2020 (now U.S. Pat. No. 11,070,398), which is a Continuation of application Ser. No. 16/162,595, filed Oct. 17, 2018 (now U.S. Pat. No. 10,693, 682), which claims priority to KR 10-2017-0135718, filed Oct. 19, 2017, the entire contents of each of which are all hereby incorporated herein by reference in their entireties.

TECHNICAL FIELD

The disclosure relates to an electronic device supporting multi-band wireless communication and a method of controlling same.

BACKGROUND

As various electronic devices, such as a smart phone, a tablet PC, a portable multimedia player (PMP), a personal digital assistant (PDA), a laptop personal computer (PC) and a wearable device, come into use, various wireless communication technologies supporting communication between the electronic devices are being developed.

In such wireless communication technologies, an implementation in a mmWave band (e.g., 28 GHz or 60 GHz band) is taken into consideration in order to satisfy the demand for increasing wireless data traffic and achieve a high data transfer rate.

Communication in the mmWave band has an advantage in that it can support a fast transmission speed, but may have a great propagation path loss because signal attenuation becomes severe and transparency becomes weak due to reduced intensity of a radio wave according to the distance as the frequency becomes high.

An electronic device supporting wireless communication in the mmWave band may support directional wireless communication based on the beamforming technology.

If an obstacle is present between devices performing wireless communication although they support directional wireless communication, a mmWave radio signal may not transmit the obstacle.

Accordingly, in such wireless communication in the mmWave band, it may be necessary to identify whether a communication environment between devices is a line of sight (LoS) environment.

SUMMARY

An electronic device supporting multi-band wireless communication according to various embodiments of the present disclosure may determine whether the electronic device and an external device to communicate with are in an LoS environment using an omnidirectional wireless communication method, and may determine whether to activate directional wireless communication.

An electronic device according to various embodiments of the present disclosure may include a housing, a first communication circuit disposed in the housing and configured to support omnidirectional wireless communication, a second communication circuit disposed in the housing and configured to support directional wireless communication using beamforming, a processor disposed in the housing and operatively coupled to the first communication circuit and the second communication circuit, and a memory disposed in the housing and operatively coupled to the processor. The processor may be configured to: receive at least one first radio signal through a communication channel from an external device capable of supporting the omnidirectional wireless communication and the directional wireless communication using the first communication circuit, determine a state of the communication channel based on at least part of the at least one first radio signal, and activate the second communication circuit based on at least part of the determined state of the communication channel wherein the second communication circuit is configured to receive a second radio signal from the external device.

A method of controlling an electronic device supporting multi-band wireless communication according to various embodiments of the present disclosure may include receiving at least one first radio signal through a communication channel from an external device capable of supporting omnidirectional wireless communication and directional wireless communication using a first communication circuit configured to support the omnidirectional wireless communication, determining a state of the communication channel based on at least part of the at least one first radio signal, and activating a second communication circuit configured to support the directional wireless communication based on at least part of the determined state wherein the second communication circuit is configured to receive a second radio signal from the external device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 11A is a diagram illustrating an example in which channel impulse responses obtained in an LoS environment and NLoS environment are expressed in a PDF form;

FIG. 12A is a diagram illustrating an example in which channel impulse responses obtained in an LoS environment and NLoS environment are expressed in a PDF form;

FIG. 12B is a diagram illustrating an example in which kurtoses obtained in an LoS environment and NLoS environment are expressed in a PDF form;

DETAILED DESCRIPTION

Figure 1:
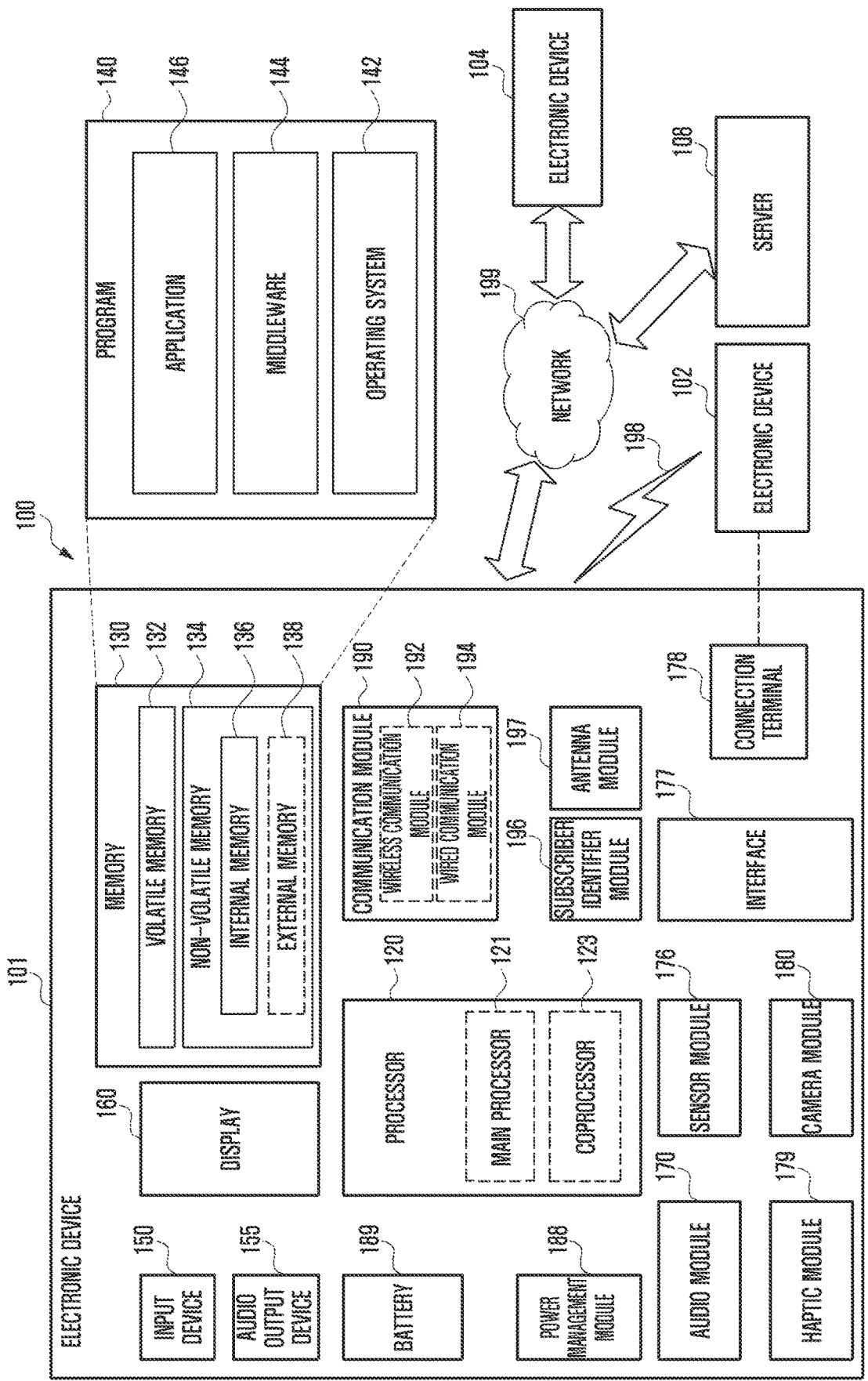
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 according to example embodiments of the present disclosure may include at least two communication circuits. The first communication circuit may be a legacy communication circuit supporting omnidirectional wireless communication. Furthermore, the second communication circuit may be a mmWave communication circuit supporting directional wireless communication.

The first communication circuit may include at least one of a cellular module, a Wi-Fi module, a Bluetooth module, a GNSS module, an NFC module and an RF module, for example.

The second communication circuit may include a communication module performing wireless communication using a mmWave band (e.g., 20~300 GHz band), for example. For example, the second communication circuit may include a Wi-Fi module supporting wireless communication using the IEEE 802.11ad standard.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
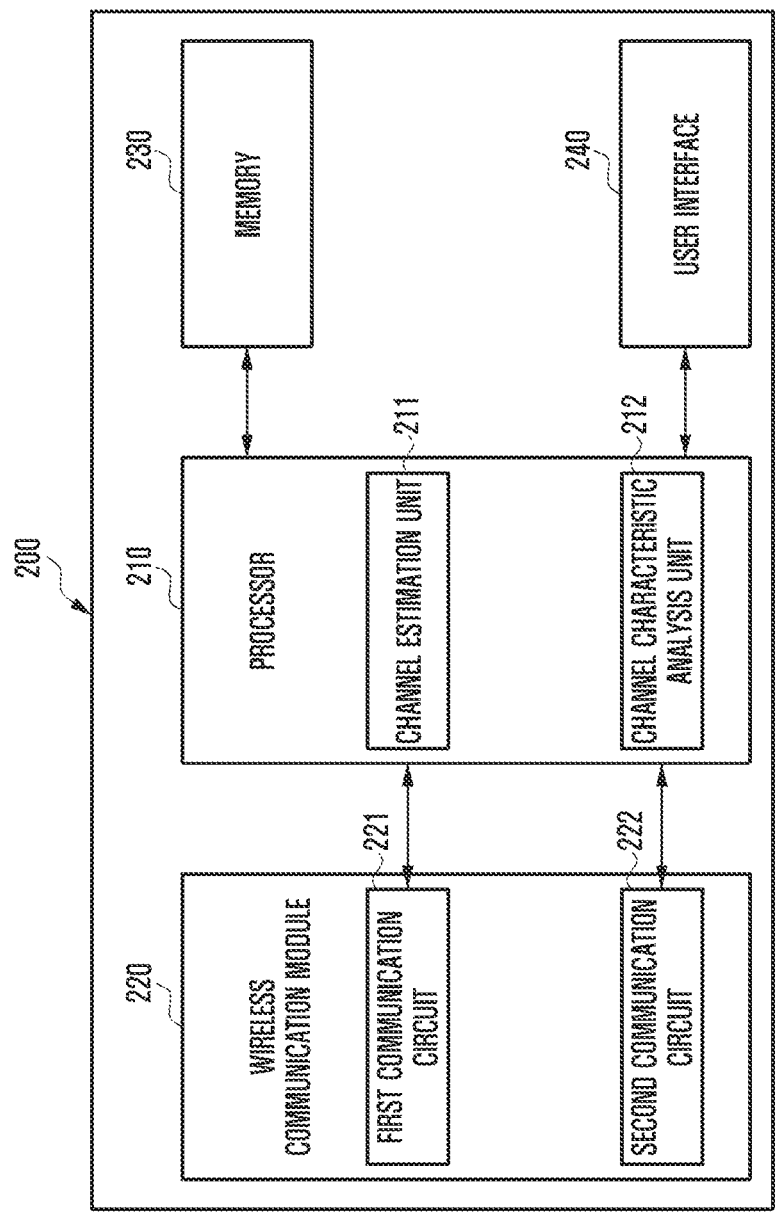
FIG. 2 is a block diagram illustrating an electronic device according to various embodiments.

FIG. 2 is a block diagram illustrating an electronic device according to various embodiments.

The electronic device 200 (e.g., the electronic device 101 of FIG. 1) may include a processor (e.g., including processing circuitry) 210 (e.g., the processor 120 of FIG. 1), a wireless communication module (e.g., including wireless communication circuitry) 220 (e.g., the wireless communication module 192 of FIG. 1), memory 230 (e.g., the memory 130 of FIG. 1) and a user interface 240. In an example embodiment, the electronic device 200 may omit at least one of the elements or may additionally include a different element.

The processor 210 (e.g., the processor 120 of FIG. 1) may include various processing circuitry, such as, for example, and without limitation, one or more of a central processing unit, an application processor, a communication processor (CP) or the like. The processor may execute operation or data processing regarding control and/or communication of at least one different element of the electronic device 200, for example. The processor 210 may include a channel estimation unit (e.g., including processing circuitry and/or program elements) 211 and a channel characteristic analysis unit (e.g., including processing circuitry and/or program elements) 212, for example. In an embodiment, the channel estimation unit 211 and the channel characteristic analysis unit 212 may be configured as separate elements distinct from the processor 210.

The channel estimation unit 211 may estimate a channel based on a signal obtained from an external device, for example. The channel estimation may be used for channel equalization for reception performance improvement. The channel may be estimated based on a channel frequency response (CFR) and/or a channel impulse response (CIR). The CFR may be understood as being a value of channel state information indicated in a frequency domain. The CIR may be understood as being a value of channel state information indicated in a time domain. For example, the channel estimation unit 211 may estimate the CFR through a least square (LS)-based channel estimation method using a pilot of orthogonal frequency division multiplexing (OFDM) symbols or a minimum mean squares error (MMSE)-based channel estimation method using the correlation of a channel or may estimate the CIR using a discrete Fourier transform (DFT)-based channel estimation method, a discrete cosine transform (DCT)-based channel estimation method or a time domain processing (TDP)-based channel estimation method.

The channel characteristic analysis unit 212 may analyze the statistical characteristics of a channel based on an estimated channel, for example. For example, multiple data packets exchanged in a connected channel or a non-connected channel may be received, and the statistical characteristics of the channel may be indicated in a probability density function (PDF) form.

The wireless communication module 220 (e.g., the wireless communication module 192 of FIG. 1) may include a first communication circuit 221 and a second communication circuit 222. According to various embodiments, at least some elements forming the wireless communication module 220, such as an antenna, may be positioned within a housing or may be formed in a housing itself (e.g., on a surface of the inside of the housing).

According to various embodiments, the first communication circuit 221 supporting omnidirectional wireless communication may include, for example, and without limitation, a legacy communication module. The legacy communication module may include at least one of a legacy cellular module, a legacy Wi-Fi module, a legacy Bluetooth module, a legacy GNSS module, a legacy NFC module and an RF module, for example.

The legacy cellular module may include, for example, and without limitation, some or all of cellular modules supporting a cellular communication system before an enhanced 5G communication system or a pre-5G communication system, for example, is supported. As a representative non-limiting example, the legacy cellular module may include a cellular module supporting wireless communication using at least one of LTE, LTE-advance (A), code division multiple access (CDMA), wideband CDMA (WCDMA), a universal mobile telecommunications system (UMTS), a wireless broadband (WiBro) and global system for mobile communications (GSM).

According to various embodiments, the second communication circuit 222 supporting directional wireless communication may include a communication module performing wireless communication using, for example, and without limitation, a mmWave band (e.g., 20~300 GHz band). For example, the second communication circuit 222 may include a Wi-Fi module supporting wireless communication using the IEEE 802.11ad standard.

The memory 230 (e.g., the memory 130 of FIG. 1) may store instructions or data related to at least one different element of the electronic device 200, for example. For example, the memory 230, may store instructions that, when executed by the processor 210 cause the electronic device 200 to receive at least one first radio signal through a communication channel from an external device capable of supporting omnidirectional wireless communication and directional wireless communication using the first communication circuit configured to support omnidirectional wireless communication, to determine the state of the communication channel based on at least part of the at least one first radio signal and to activate the second communication circuit configured to support the directional wireless communication based on at least part of the determined state so that the second communication circuit receives a second radio signal from the external device.

The user interface 240 may include at least one of a touch screen display, a microphone and a speaker, for example.

The electronic device 200 according to various embodiments includes a housing, the first communication circuit 221 disposed in the housing and configured to support omnidirectional wireless communication, the second communication circuit 222 disposed in the housing and configured to support directional wireless communication using beamforming, the processor 210 disposed in the housing and operatively coupled to the first communication circuit 221 and the second communication circuit 222, and the memory 230 disposed in the housing and operatively coupled to the processor 210. The processor 210 may be configured to receive at least one first radio signal through a communication channel from an external device capable of supporting the omnidirectional wireless communication and directional wireless communication using the first communication circuit, to determine the state of the communication channel based on at least part of the at least one first radio signal and to activate the second communication circuit so that it receives a second radio signal from the external device based on at least part of the determined state of the communication channel.

The first communication circuit 221 of the electronic device 200 according to various embodiments may be configured to support a first carrier frequency corresponding to a 2.4 GHz band or 5.0 GHz band.

The second communication circuit 222 of the electronic device 200 according to various embodiments may be configured to support a second carrier frequency corresponding to a 60 GHz band.

The first communication circuit 221 of the electronic device 200 according to various embodiments may be configured to support cellular communication, that is, at least part of the omnidirectional wireless communication.

The processor 210 of the electronic device 200 according to various embodiments may be configured to determine whether the electronic device and the external device are in a line of sight (LoS) as part of the determined state.

The processor 210 of the electronic device 200 according to various embodiments may be configured to perform an operation of determining the state of the communication channel if received signal strength indication (RSSI) corresponding to the at least one first radio signal satisfies a given condition.

The processor 210 of the electronic device 200 according to various embodiments may be configured to deactivate the second communication circuit 222 if the RSSI does not satisfy the given condition.

The processor 210 of the electronic device 200 according to various embodiments may be configured to determine a skewness or kurtosis based on at least part of a CFR or CIR corresponding to the at least one first radio signal and to perform the activating operation if the skewness or kurtosis satisfies a given condition.

The processor 210 of the electronic device 200 according to various embodiments may be configured to receive a radio signal transmitted at a first point of time and a radio signal transmitted at a second point of time as at least part of the at least one first radio signal from the external device and to identify a corresponding one of the skewness and kurtosis based on at least part of the radio signal transmitted at the first point of time and the radio signal transmitted at the second point of time.

The first radio signal of the electronic device 200 according to various embodiments includes a preamble including a plurality of training symbols. The processor 210 may be configured to identify the determined state using at least some of the plurality of training symbols.

The processor 210 of the electronic device 200 according to various embodiments may be configured to receive the second radio signal from the external device using the second communication circuit 222 while the second communication circuit 222 is activated, to determine a connection state with the external device based on the second radio signal and to deactivate the second communication circuit 222 based on the identified connection state.

The processor 210 of the electronic device 200 according to various embodiments may be configured to perform the operation of receiving the at least one first radio signal while the second communication circuit 222 is deactivated.

The processor 210 of the electronic device 200 according to various embodiments may be configured to determine the state of the first radio signal based on at least one of the characteristics of transmitted content, the characteristics of the external device and the moving state of the electronic device.

The first communication circuit 221 and second communication circuit 222 of the electronic device 200 according to various embodiments may be configured to be included in the same chip.

Figure 3:
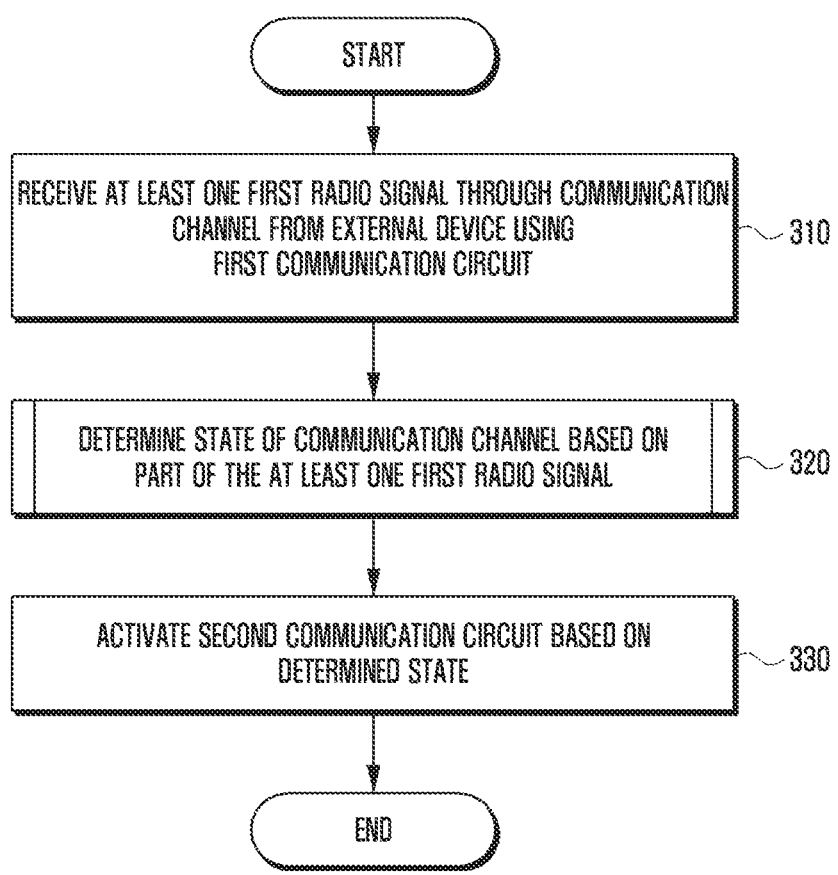
FIG. 3 is a flowchart illustrating a method of controlling an electronic device according to various embodiments.

FIG. 3 is a flowchart illustrating a method of controlling an electronic device according to various embodiments.

Referring to FIG. 3, at operation 310, the processor 210 (e.g., the processor 120 of FIG. 1) of the electronic device 200 (e.g., the electronic device 101 of FIG. 1) may receive at least one first radio signal through a communication channel from an external device (e.g., the electronic device 102, electronic device 104 or server 108 of FIG. 1) using the first communication circuit 221 configured to support omnidirectional wireless communication.

According to various embodiments, the first communication circuit 221 supporting omnidirectional wireless communication may include, for example, and without limitation, a legacy communication module. The legacy communication module may include at least one of a legacy cellular module, a legacy Wi-Fi module, a Bluetooth module, a GNSS module, an NFC module and an RF module, for example.

The legacy cellular module may include, for example, and without limitation, some or all of cellular modules supporting a cellular communication system before an enhanced 5G communication system or a pre-5G communication system, for example, is supported. As a representative example, the legacy cellular module may include a cellular module supporting wireless communication using at least one of LTE, LTE-A, CDMA, WCDMA, a UMTS, WiBro and GSM.

The legacy Wi-Fi module may include a Wi-Fi module supporting wireless communication using at least one standard of IEEE 802.11a, IEEE 802.11g, IEEE 802.11n and IEEE 802.11ac, for example. For example, the legacy Wi-Fi module may refer, for example, to a Wi-Fi module having a carrier frequency in a 2.4 GHz band or 5.0 GHz band.

According to various embodiments, the external device may include a legacy communication module having the same standard as the electronic device 200. For example, the first communication circuit of the electronic device 200 includes a Wi-Fi module having a carrier frequency in the 2.4 GHz band or 5.0 GHz band, the external device may also include a Wi-Fi module having a carrier frequency in the 2.4 GHz band or 5.0 GHz band.

At operation 320, the processor 210 of the electronic device 200 may determine the state of a communication channel based on at least part of the at least one first radio signal. The communication channel through which the at least one first radio signal is exchanged may, for example, and without limitation, be a time-unvarying channel whose channel characteristic does not vary during the cycle of a symbol, for example. In this case, even in the case of such a time-unvarying channel, when a relative movement between devices that transmit and receive first radio signals occurs, inter-channel interference (ICI) occurs, so communication performance may be deteriorated. Accordingly, many methods of estimating and compensating such ICI are present.

ICI may include a change of a multi-path channel over time. For example, the state of a communication channel in addition to ICI may be identified by estimating an impulse response in a sampling cycle unit. For example, if a method including a given symbol in a given frame is used, ICI can be estimated and the state of a communication channel can also be identified. Accordingly, a method of estimating the state of a communication channel according to various embodiments of the present disclosure may be based on various methods of estimating ICI.

According to various embodiments, the electronic device 200 may estimate a CFR through an LS-based channel estimation method using a pilot of an OFDM symbol or an MMSE-based channel estimation method using the correlation of a channel, and may determine the state of a communication channel.

According to various embodiments, the electronic device 200 may estimate a CIR using a DFT-based channel estimation method, a DCT-based channel estimation method or a TDP-based channel estimation method, and may determine the state of a communication channel.

When the state of the communication channel is identified, at operation 330, the processor 210 of the electronic device 200 may activate the second communication circuit 222 configured to support directional wireless communication so that it receives a second radio signal from the external device based on at least part of the determined state of the communication channel. For example, if, as a result of the identification of the state of the communication channel, the electronic device 200 is found to be in the LoS with the external device, the processor 210 may activate the second communication circuit 222. For another example, if, as a result of the identification of the state of the communication channel, the electronic device 200 is found to be in a non-line of sight (NLoS) with the external device, the processor 210 may deactivate the second communication circuit 222.

According to various embodiments, the second communication circuit 222 supporting directional wireless communication may include, for example, and without limitation, a communication module performing wireless communication using a mmWave band (e.g., 20~300 GHz band). For example, the second communication circuit 222 may include a Wi-Fi module supporting wireless communication using the IEEE 802.11ad standard. The IEEE 802.11ad has a carrier frequency in the 60 GHz band, and may have a directional wireless communication characteristic by collecting and transmitting energy of radio waves based on the beamforming technology.

Figure 4:
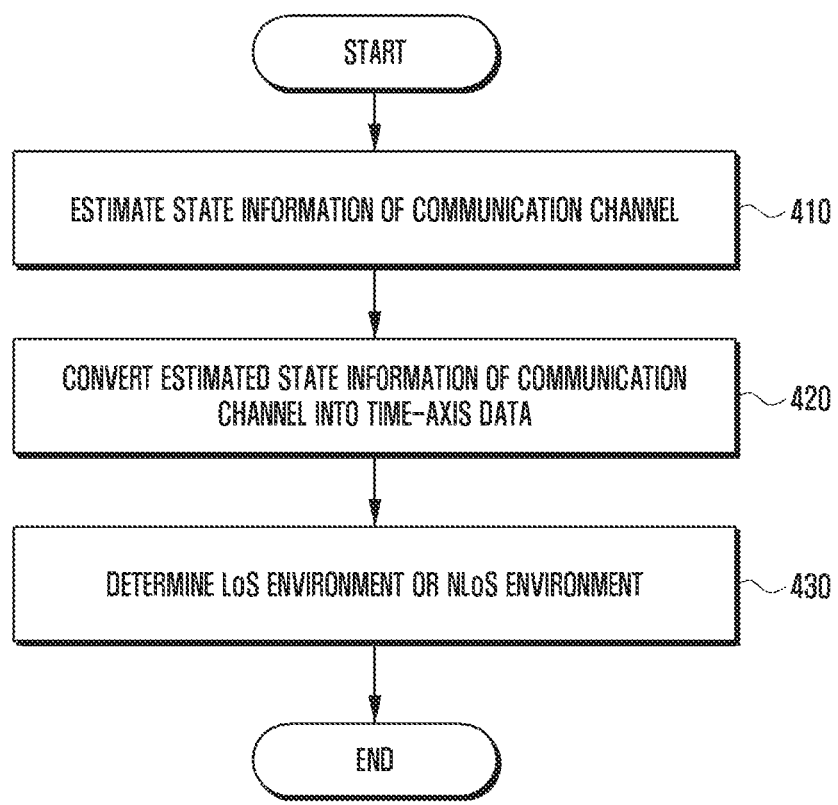
FIG. 4 is a flowchart illustrating a method of determining the state of a communication channel according to various embodiments.

FIG. 4 is a flowchart illustrating a method of determining the state of a communication channel according to various embodiments.

FIG. 4 is an example embodiment of the operation of determining the state of the communication channel based on at least part of the at least one first radio signal at operation 320 of FIG. 3. FIG. 4 is illustrated as using the DFT-based channel estimation method, but embodiments of the present disclosure are not limited thereto.

At operation 410, the processor 210 (e.g., the processor 120 of FIG. 1) of the electronic device 200 (e.g., the electronic device 101 of FIG. 1) may estimate state information of a communication channel based on at least part of at least one first radio signal received from an external device. The state information of the communication channel may refer, for example, to a change over time in the communication channel, which occurs in a multi-path channel due to ICI, for example.

According to various embodiments, the electronic device 200 may estimate the state information of the communication channel through training. Training is a process of identifying a Doppler effect according to multi-path interference and mobility in a mobile reception environment, for example. For example, the first radio signal may be transmitted in a packet form. Such a packet may include training symbols within a predefined area. The electronic device 200 is already aware of an area including training symbols within a received packet, and may estimate state information of a communication channel based on the training symbols.

The state information of the communication channel estimated through the training may include a CFR form, that is, frequency area values because it is obtained through a PHY layer.

The processor 210 of the electronic device 200 that has estimated the state information of the communication channel at operation 410 may perform an operation of converting the estimated state information of the communication channel into time-axis data at operation 420. According to various embodiments, the processor 210 may convert the estimated state information into the time-axis data using inverse fast Fourier transform (IFFT).

A CFR may not be easy in analyzing channel characteristics because it does not express a latency time and multi-path. Accordingly, the CFR may be converted into a CIR form in which a latency time and multi-path value are incorporated.

State information of a communication channel estimated through training is obtained in a CFR form in a frequency domain, but may be converted into a CIR form in a time domain by performing IFFT on a CFR.

The processor 210 of the electronic device 200 that has converted the estimated state information of the communication channel into the time-axis data may determine whether the electronic device 200, the first communication circuit 221 of the electronic device 200 or a corresponding antenna is in the LoS or NLoS with the external device that has transmitted the first radio signal at operation 430.

According to various embodiments, the electronic device 200 may estimate state information of a communication channel whenever it receivers a first radio signal. For example, the electronic device 200 may obtain a CIR whenever it receives a first radio signal. Such a CIR may be accumulated in the memory 230.

According to various embodiments, the electronic device 200 may determine the statistical characteristics of a multi-path channel using accumulated CIRs. For example, the electronic device 200 may determine the statistical characteristics of a multi-path channel through a probability density function (PDF) form. Since each of the CIRs includes amplitude values according to a latency time, the electronic device 200 may calculate the mean of amplitude values in a given channel and a standard deviation thereof through the accumulated CIRs. That is, an impulse response in a given channel may be expressed in a PDF form. The electronic device 200 may analyze the PDF form based on various criteria, and may determine whether the electronic device 200 and an external device, the first communication circuit 221 of the electronic device 200 and the external device or the antenna of the electronic device 200 and the external device are in the LoS or NLoS. For example, the electronic device 200 may determine whether they are in the LoS or NLoS depending on how much amplitude values expressed in a PDF form are symmetrical and/or how much amplitude values form a sharp form.

In accordance with an example embodiment, the electronic device 200 may determine whether the electronic device 200 and an external device, the first communication circuit 221 of the electronic device 200 and the external device or the antenna of the electronic device 200 and the external device are in the LoS or NLoS based on an amplitude value in a given latency time within accumulated CIRs. For example, the electronic device 200 may add an amplitude value in a first given latency time and an amplitude value in a second given latency time together, and may determine whether they are in the LoS or NLoS by comparing the sum with the sum of all amplitude values. For another example, the electronic device 200 may determine whether they are in the LoS or NLoS by comparing an amplitude value in a first given latency time with an amplitude value in a second given latency time. The amplitude value in the first given latency time and the amplitude value in the second given latency time may be used to identify the LoS environment solely or in combination.

A specific number of samples or more may be necessary to express the statistical characteristics of a channel in a PDF form. For example, one packet may be one sample. Accordingly, the statistical characteristics of a channel may be expressed in a PDF form only when a least a plurality of packets is obtained. The number of required samples may be designated and may be adjusted depending on the environment. For example, the number of required samples may be designated to be 10 indoors and may be designated to be a number at least greater than 10 outdoors.

Figure 5:
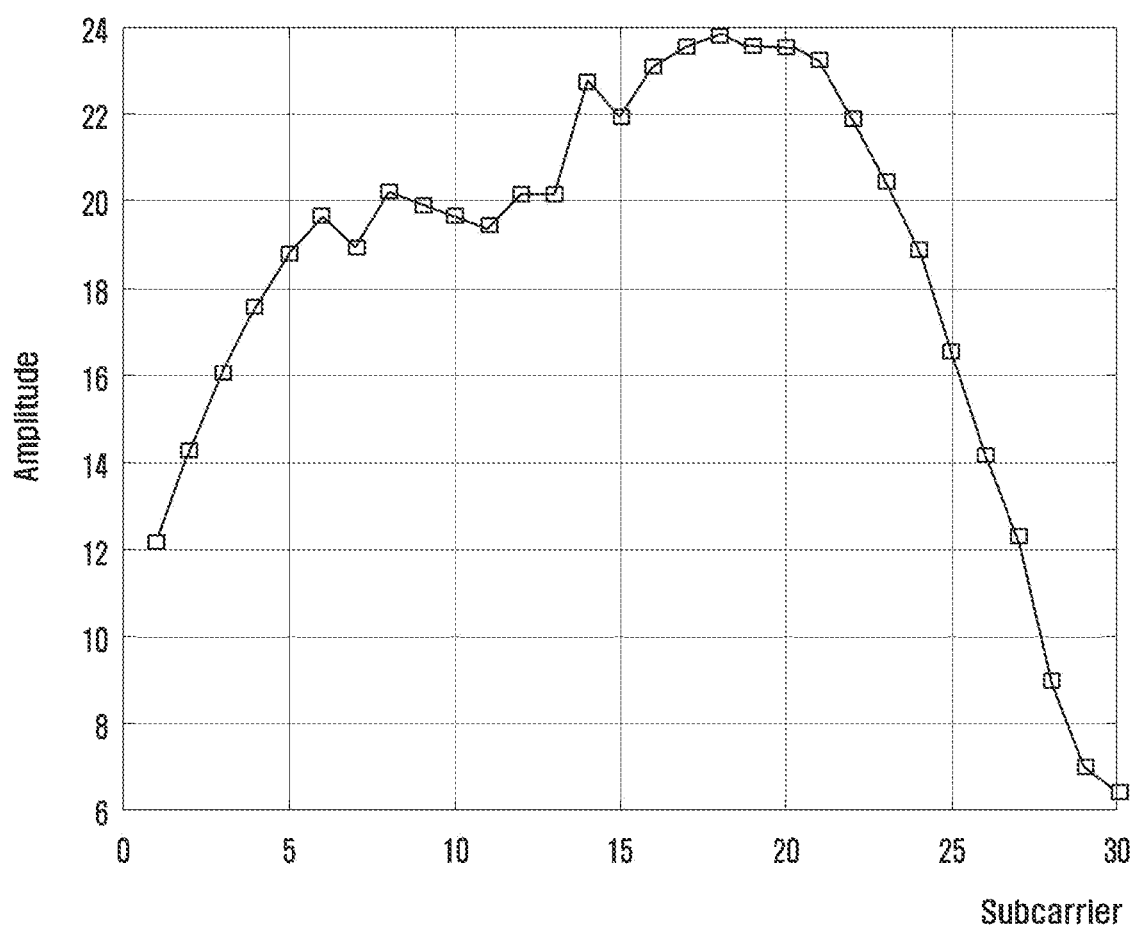
FIG. 5 is graph illustrating estimated state information of a channel in an LoS environment.

FIG. 5 is a graph illustrating an example showing estimated state information of a channel in the LoS environment. From FIG. 5, it may be seen that the state information of the channel is expressed in a CFR form because amplitude values are identified based on subcarriers. The electronic device according to an example embodiment may deliver a CFR used in the PHY layer to the processor. For example, the electronic device may store the CFR in the register of MAC or produce a separate data path and deliver it to the processor.

Figure 6:
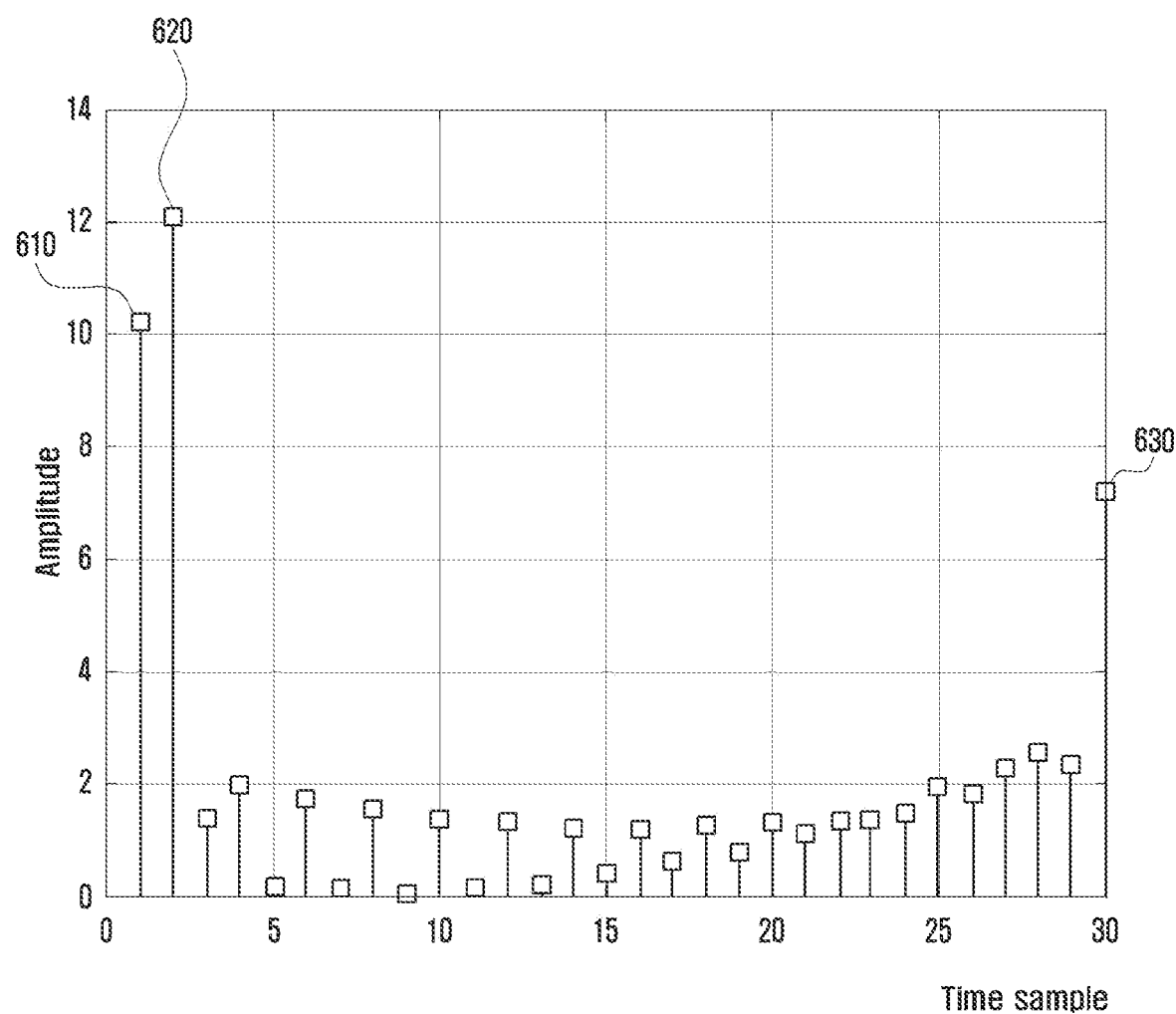
FIG. 6 a graph illustrating an example in which the state information of the channel illustrated in FIG. 5 has been converted into time-axis data.

FIG. 6 is a graph illustrating an example in which the state information of the channel shown in FIG. 5 has been converted into time-axis data. From FIG. 6, it may be seen that 610, 620 and 630 having values of a given amplitude value (e.g., 6 dB) or more mean CIRs and signal values at locations other than the CIRs correspond to noise components. That is, a transmitted signal is delayed and received at the locations 610, 620 and 630 through a multi-path channel. The received signals may be construed as having amplitude values corresponding to 610, 620 and 630.

According to various embodiments, the electronic device 200 may determine whether it is located in the LoS or NLoS based on an amplitude value in a given latency time within accumulated CIRs. For example, the electronic device 200 may add amplitude values corresponding to 610 and 620 together, and may identify the LoS environment by identifying whether the sum of the amplitude values corresponding to 610 and 620 is a given ratio or more of the sum of all amplitude values. For another example, the electronic device 200 may identify the LoS environment by identifying whether the amplitude value corresponding to 610 is greater than the amplitude value corresponding to 620. The amplitude values corresponding to 610 and 620 may be criteria for identifying the LoS environment individually or simultaneously.

Figure 7:
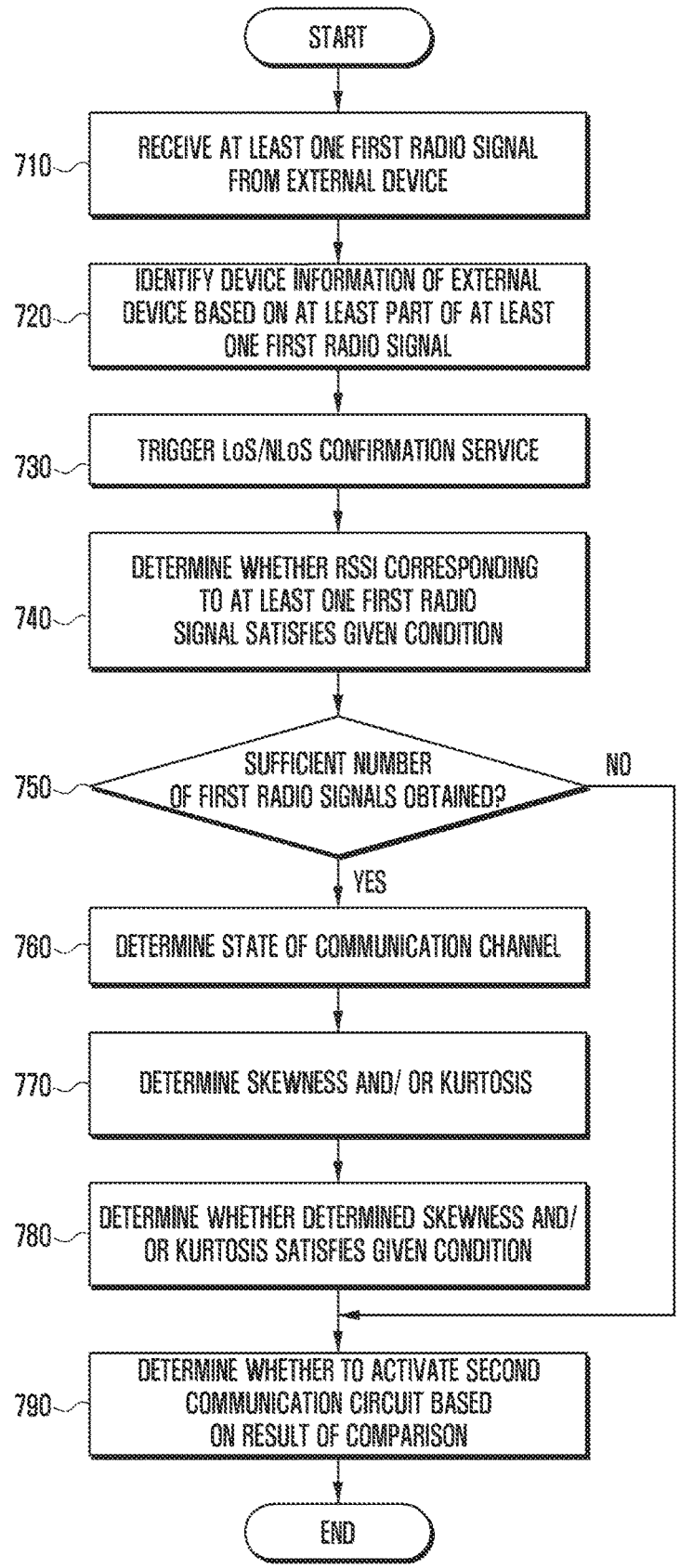
FIG. 7 is a flowchart illustrating a method of controlling an electronic device according to various embodiments.

FIG. 7 is a flowchart illustrating a method of controlling an electronic device according to various embodiments.

Referring to FIG. 7, at operation 710, the processor 210 (e.g., the processor 120 of FIG. 1) of the electronic device 200 (e.g., the electronic device 101 of FIG. 1) may control the first communication circuit 221 configured to support omnidirectional wireless communication to receive at least one first radio signal through a communication channel from an external device.

According to various embodiments, the first communication circuit 221 may include, for example, and without limitation, a legacy Wi-Fi module supporting wireless communication using at least one standard of IEEE 802.11a, IEEE 802.11g, IEEE 802.11n and IEEE 802.11ac.

According to various embodiments, the first radio signal may include, for example, and without limitation, at least one of a data packet, a beacon, a probe request and a probe response depending on a connection state.

A channel having the widest bandwidth may be selected as the channel through which the first radio signals are transmitted and received. For example, in the standard such as 802.11n or 802.11ac, a bandwidth may be selected. For example, a channel having at least one bandwidth of 40 MHz, 80 MHz and 160 MHz may be selected. In this case, the electronic device may select the channel of the 160 MHz bandwidth having a relatively wide bandwidth. The reason for this is that as the bandwidth is widened, the accuracy of monitoring results may increase.

At operation 720, the processor 210 of the electronic device 200 may identify device information of the external device based on at least part of the at least one first radio signal.

According to various embodiments, the first radio signal may include device information of the external device. For example, in accordance with the IEEE 802.11 standard, a packet, such as a beacon, a probe request or a probe response, may include a management frame.

Figure 8:
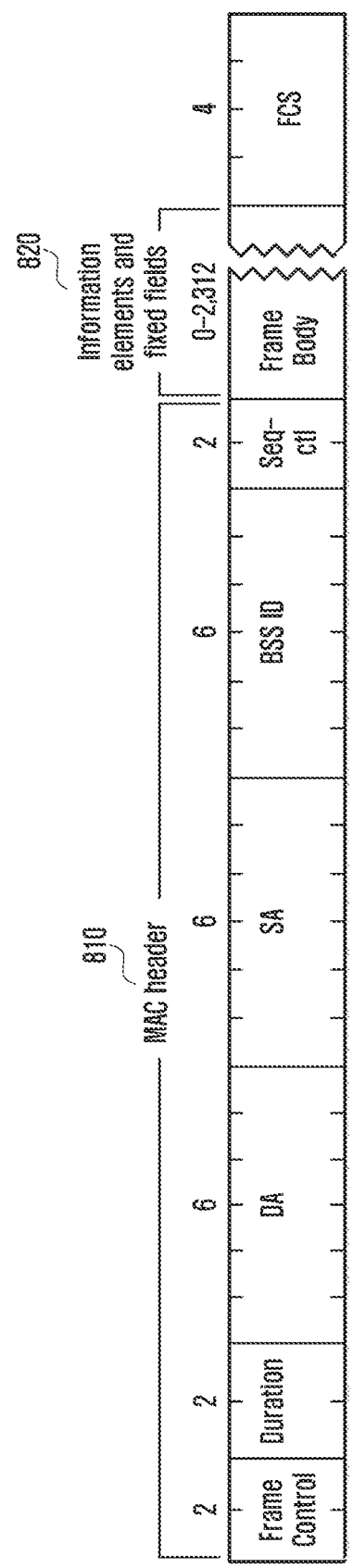
FIG. 8 is a diagram illustrating a management frame according to various embodiments.

FIG. 8 illustrates a management frame according to various embodiments. Referring to FIG. 8, the management frame may, for example, be divided into a MAC header 810 and a frame body 820. The MAC header 810 may include a frame control region, duration (or association ID (AID)) and 3 (or 4) addresses, for example. The frame body 820 may include a higher layer message, such as information for control and management or logical link control (LLC), that is, a MAC service data unit (MSDU). Furthermore, in accordance with a standard added to IEEE 802.11ad, the frame body 820 may include an information field. The information field may include information about multiple bands capable of being supported by a device.

Figure 9:
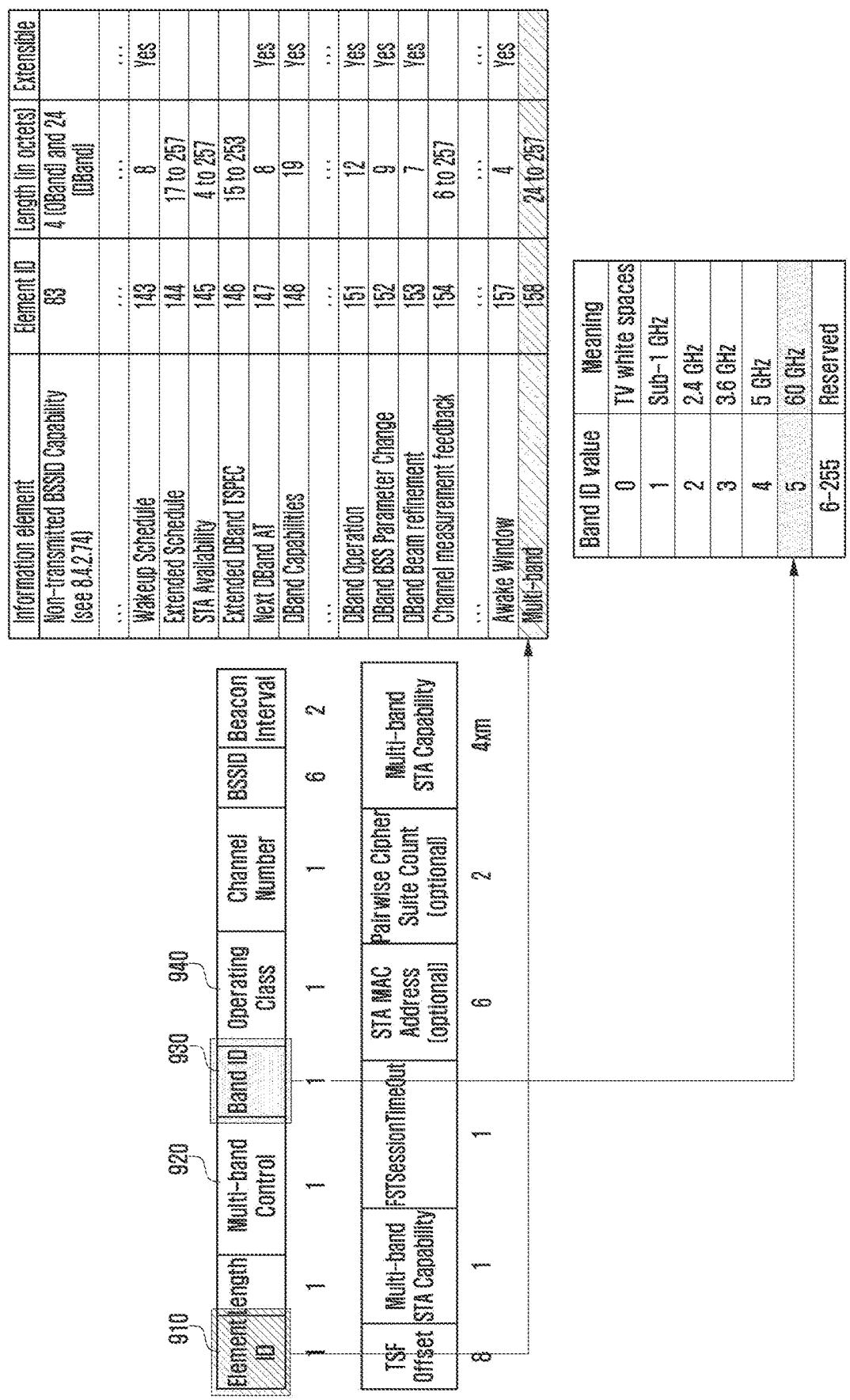
FIG. 9 is a diagram illustrating part of an information field including information about multiple bands according to various embodiments.

FIG. 9 is a diagram illustrating part of an information field including information about multiple bands according to various embodiments. Referring to FIG. 9, the information field may include at least an element ID field 910, a multi-band control field 920, a band ID field 930 and an operating class field 940.

The element ID field 910 may show that information related to a multi-band has been included in the information field, for example. For example, if the element ID field indicates "158", it may indicate that an external device that has transmitted a first radio signal supports a multi-band.

The multi-band control field 920 may include device role information about a role being performed by an external device in a used frequency band, preference connection information, for example.

The band ID field 930 may include information about a communication capability supported by an external device, for example. For example, if the band ID field indicates "5", it may indicate that an external device has a carrier frequency in the 60 GHz band.

The operating class field 940 includes information about channels permitted in each country from among a plurality of channels, for example. For example, a 60 GHz frequency band may have four channels. Channels permitted for each country from among the four channels may be different. For example, in the United States, three channels have been permitted in the 60 GHz frequency band. In this case, the operating class field may record that only the three channels are permitted.

In accordance with an example embodiment, the electronic device 200 that has received the first radio signal (e.g., a beacon) from the external device may obtain device information of the external device with reference to the information field, and may determine whether the external device supports a multi-band.

The processor 210 of the electronic device 200 that has identified the device information of the external device at operation 720 may determine whether to trigger LoS/NLoS confirmation service at operation 730. In accordance with an example embodiment, the electronic device 200 may determine that the external device can support second wireless communication, and may determine whether to trigger LoS/NLoS confirmation service.

Whether the electronic device and an external device are in the LoS and/or the NLoS may be problematic when directional wireless communication is performed in a mmWave band. For example, if only omnidirectional wireless communication is to be used, a process of determining whether the electronic device and an external device are in the LoS and/or the NLoS may be unnecessary. For example, if only omnidirectional wireless communication is to be used or if an external device does not support directional wireless communication, an unnecessary power loss and memory consumption may be caused by determining whether the electronic device and an external device are in the LoS and/or the NLoS. In accordance with an example embodiment, the electronic device 200 may determine whether the electronic device and an external device are in the LoS and/or the NLoS based on the trigger of LoS/NLoS confirmation service.

According to various embodiments, the LoS/NLoS confirmation service may be triggered in response to a user's command or the occurrence of a given event.

The triggering of LoS/NLoS confirmation service in response to a user's command may include a case where an application to identify the LoS environment is executed or a case where a user activates the second communication circuit 222, for example.

The triggering of LoS/NLoS confirmation service based on the occurrence of a given event may include triggering based on the characteristics of transmitted content, the characteristics of an external device, and the moving state of the electronic device 200, for example.

The triggering based on the characteristics of transmitted content may include various cases, such as a case where using the second communication circuit 222 rather than the first communication circuit 221 depending on the capacity of content, a method of transmitting content or an application used to transmit content is determined to be more efficient, for example. In an embodiment, if streaming service for content (e.g., UHD video) having high resolution is required, the electronic device 200 may recognize that a great bandwidth is necessary and trigger LoS/NLoS confirmation service.

The triggering based on the characteristics of the external device may include various cases, such as a case where using the second communication circuit 222 rather than the first communication circuit 221 based on device information of an external device is determined to be more efficient, for example. In an embodiment, if the buffer of an external device is determined to be great compared to transmission speed according to the first communication circuit 221, the electronic device 200 may trigger LoS/NLoS confirmation service in order to transmit data to the second communication circuit 222 having higher transmission speed than the first communication circuit 221.

The triggering based on the moving state of the electronic device 200 may include a case where a movement of the electronic device 200 is obtained by GPS sensors, for example. For example, the electronic device 200 may determine the state of a communication channel when a movement of the electronic device 200 is obtained, and may check a change in the LoS/NLoS environment. In another embodiment, the electronic device 200 may trigger LoS/NLoS confirmation service when a movement of an external device is obtained.

At operation 740, when the LoS/NLoS confirmation service is triggered, the processor 210 of the electronic device 200 may determine whether RSSI corresponding to the at least one first radio signal satisfies a given condition.

RSSI may refer to a numerical value indicative of power of a signal received by the electronic device 200. A method of measuring RSSI is evident to a person having ordinary skill in the art, and thus a detailed description thereof in this document is omitted.

In accordance with various embodiments, the given condition may include that RSSI corresponding to the first radio signal is greater than or equal to a first threshold. For example, the electronic device 200 may previously designate the first threshold (e.g., −50 dBm) and determine whether RSSI corresponding to the first radio signal is greater than or equal to the first threshold. If the RSSI corresponding to the first radio signal is determined to be greater than or equal to the first threshold, the electronic device 200 may determine that the given condition is satisfied. For another example, if the RSSI corresponding to the first radio signal is determined to be smaller than the first threshold, the electronic device 200 may determine that the given condition is not satisfied.

At operation 750, the processor 210 of the electronic device 200 may determine whether a sufficient number of the first radio signals have been obtained.

In accordance with various embodiments, the electronic device 200 may collect the one or more first radio signals having RSSI satisfying a given condition. For example, a specific number of samples (e.g., 10) or more are required to express the statistical characteristics of a channel in a PDF form. The electronic device 200 may collect a predetermined number of samples (e.g., 10) of the first radio signals having RSSI satisfying a given condition. The number of required samples of the first radio signals may be previously designated and may be adjusted depending on the environment. For example, the number of required samples may be designated to be 10 indoors and may be designated to be a number at least greater than 10 outdoors.

In accordance with various embodiments, the electronic device 200 may determine whether RSSI corresponding to a received first radio signal satisfies a given condition whenever it receives the first radio signal. For example, the electronic device 200 may collect a first radio signal having RSSI satisfying a given condition and may not collect a first radio signal having RSSI not satisfying a given condition.

In accordance with various embodiments, the electronic device 200 may collect first radio signals and determine the mean RSSI corresponding to the collected first radio signals satisfies a given condition. For example, the electronic device 200 may first collect first radio signals corresponding to the number of required samples, may obtain the mean RSSI of the collected first radio signals, and may determine whether the mean RSSI satisfies a given condition.

If it is determined that the sufficient number of first radio signals has been obtained at operation 750, the processor 210 of the electronic device 200 may determine the state of the communication channel based on at least some of the sufficient number of first radio signals at operation 760. According to various embodiments, the first radio signal includes a preamble including a plurality of first training symbols (e.g., short training symbol) and a plurality of second training symbols (e.g., long training symbol). The electronic device 200 may determine the state of the communication channel using at least some of the plurality of first training symbols and the plurality of second training symbols.

Figure 10:
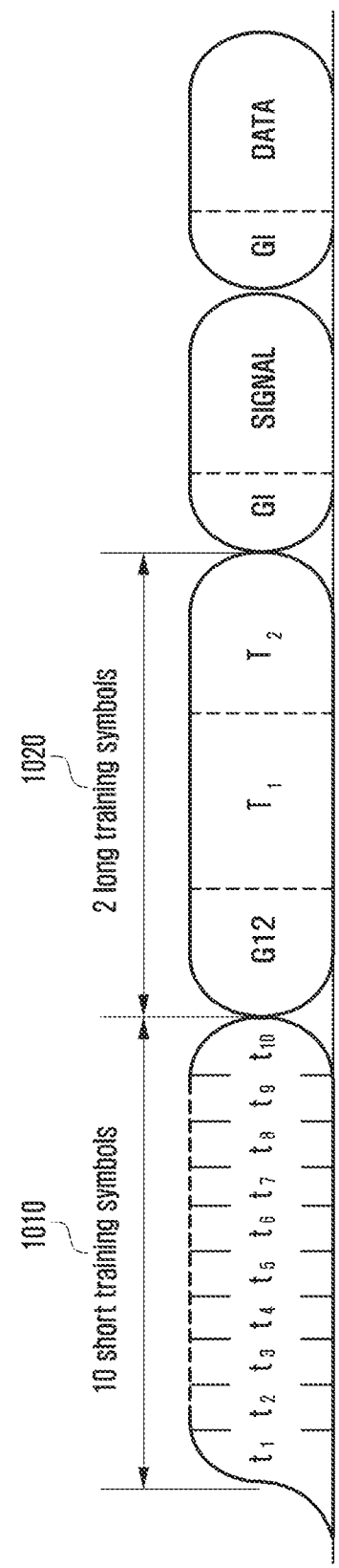
FIG. 10 is a diagram illustrating an example of a preamble including short training symbols and long training symbols according to various embodiments.

FIG. 10 is a diagram illustrating an example of a preamble including short training symbols and long training symbols. The short training symbol 1010 may include a short training OFDM symbol. The short training symbols 1010 may be used for frame timing acquisition, automatic gain control (AGC), diversity detection and coarse frequency/time synchronization, for example. The long training symbols 1020 may include a long training OFDM symbol. The long training symbols 1020 may be used for fine frequency/time synchronization and channel estimation.

The electronic device 200 is already aware of an area including training symbols within a packet, and may determine the state of a communication channel based on a plurality of training symbols (in particular, long training symbols). Operation 760 is substantially the same as operation 320 of FIG. 3, and thus a detailed description thereof is substituted with the description of operation 320.

At operation 770, the processor 210 of the electronic device 200 may determine skewness and/or a kurtosis based on at least part of the determined state of the communication channel.

FIG. 11A is an example in which channel impulse responses obtained in an LoS environment and NLoS environment are expressed in a PDF form. Skewness may refer, for example, to a value numerically indicating how much amplitude values are asymmetric after accumulated impulse responses are expressed in a PDF form based on an amplitude value. Channel impulse responses obtained in a given channel may be expressed in a PDF form based on an amplitude value. From (a) of FIG. 11A in which channel impulse responses obtained in the LoS environment are expressed in a PDF form, it may be intuitively seen that amplitude values have a symmetrical form based on an amplitude value 1110 having the highest density. On the other hand, from (b) of FIG. 11A in which channel impulse responses obtained in the NLoS environment are expressed in a PDF form, it may be intuitively seen that amplitude values are asymmetrically distributed based on an amplitude value 1120 having the highest density. This may be aware more clearly by calculating skewness. For example, the skewness may be calculated (determined) through the following equation:

$$s = \frac{E\{\chi - \mu\}^3}{\sigma^3}$$

In this equation, s may refer to skewness, $\chi$ may refer to an amplitude value, p may refer to the mean of amplitude values, $\sigma$ may refer a standard deviation, and E may refer a frequency distribution.

In this case, the skewness(s) may form symmetry as it is closer to 0, that is, the LoS environment.

Figure 11B:
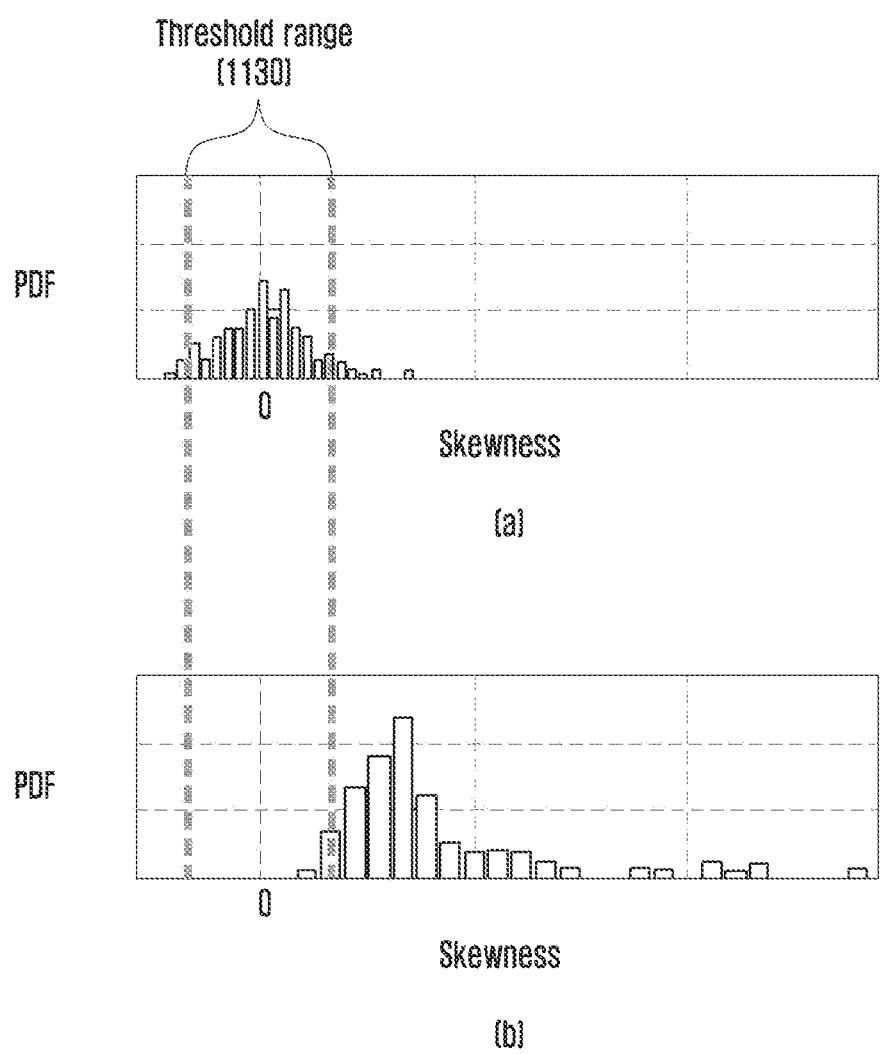
FIG. 11B is a diagram illustrating an example in which skewnesses obtained in an LoS environment and NLoS environment are expressed in a PDF form.

FIG. 11B is a diagram illustrating an example in which skewnesses obtained in an LoS environment and NLoS environment are expressed in a PDF form. For example, from (a) of FIG. 11B in which skewnesses obtained in the LoS environment are expressed in a PDF form, it may be seen that the skewnesses chiefly have values closer to 0. On the other hand, from (b) of FIG. 11B in which skewnesses obtained in the NLoS environment are expressed in a PDF form, it may be seen that the skewnesses are distributed to various values greater than or smaller than 0.

If such a characteristic is used, skewness may be used to determine an LoS environment and/or an NLoS environment. For example, an LoS environment and/or an NLoS environment may be determined by previously setting a threshold range and identifying whether obtained skewness falls within the threshold range. More specifically, if obtained skewness is in a predetermined first range (e.g., −1~1), the electronic device 200 may determine that it is in the LoS environment along with an external device. If the obtained skewness is out of the predetermined first range, the electronic device 200 may determine that it is in the NLoS environment along with the external device.

FIG. 12A is a diagram illustrating an example in which channel impulse responses obtained in an LoS environment and NLoS environment are expressed in a PDF form. A kurtosis may refer, for example, to a value numerically indicating how much amplitude values have a sharp form after accumulated impulse responses are expressed in a PDF form based on an amplitude value.

Channel impulse responses obtained in a given channel may be expressed in a PDF form based on an amplitude value. From (a) of FIG. 12A in which channel impulse responses obtained in the LoS environment are expressed in a PDF form, it may be seen that amplitude values have a sharp form based on an amplitude value having the highest probability. On the other hand, from (b) of FIG. 12A in which channel impulse responses obtained in the NLoS environment are expressed in a PDF form, it may be seen that amplitude values have a relatively gentle form based on an amplitude value having the highest probability. This may be aware more clearly through a PDF of a kurtosis. For example, the kurtosis may be calculated (determined) through the following equation:

$$k = \frac{E\{\chi - \mu\}^4}{\sigma^4}$$

In this equation, k may refer to a kurtosis, $\chi$ may refer to an amplitude value, p may refer to the mean of amplitude values, $\sigma$ may refer to a standard deviation, and E may refer to a frequency distribution.

In this case, the kurtosis (k) is sharp as it increases, that is, the LoS environment.

FIG. 12B is a diagram illustrating an example in which kurtoses obtained in an LoS environment and NLoS environment are expressed in a PDF form. For example, from (a) of FIG. 12B in which kurtoses obtained in the LoS environment are expressed in a PDF form, it may be seen that the kurtoses have relatively great values. On the other hand, from (b) of FIG. 12B in which kurtoses obtained in the NLoS environment are expressed in a PDF form, it may be seen that the kurtoses have relatively small values.

If such a characteristic is used, a kurtosis may be used to determine an LoS environment and/or an NLoS environment. For example, the LoS environment and/or the NLoS environment may be determined by previously setting a threshold 1230 and identifying whether an obtained kurtosis is greater than the threshold 1230. More specifically, if an obtained kurtosis is greater than or equal to the threshold 1230, the electronic device 200 may determine that it is in the LoS along with an external device. If the obtained kurtosis is smaller than the threshold 1230, the electronic device 200 may determine that it is in the NLoS along with the external device.

Referring back to FIG. 7, the processor 210 of the electronic device 200 that has determined skewness and/or a kurtosis may determine whether the determined skewness and/or kurtosis satisfies a given condition at operation 780.

According to various embodiments, the electronic device 200 may identify whether skewness for the state of a communication channel is in a predetermined first range (e.g., a threshold range 1130 of FIG. 11B). For example, the electronic device 200 may determine an LoS environment or NLoS environment depending on whether skewness is in the predetermined first range. For example, if digitized skewness is in a predetermined first range (e.g., −1~1), the electronic device 200 may determine that an external device is in an LoS environment.

According to various embodiments, the electronic device 200 may identify (determine) whether a kurtosis for the state of a communication channel is greater than a second threshold (e.g., a threshold 1230 of FIG. 12B). For example, the electronic device 200 may determine an LoS environment or NLoS environment depending on whether a digitized kurtosis is greater than the second threshold. For example, if the digitized kurtosis is greater than the predetermined second threshold (e.g., 1), the electronic device 200 may determine that an external device is in an LoS environment.

Although not shown, the first range related to skewness and/or the second threshold related to kurtosis may vary depending on the distance between the electronic device 200 and an external device. For example, the electronic device 200 may determine the distance between the electronic device 200 and an external device based on RSSI corresponding to a first radio signal, and may determine the first range and/or the second threshold based on the determined distance. In accordance with another embodiment, the electronic device 200 may determine whether it is located indoors or outdoors using GPS sensors, and may determine the first range related to skewness and/or the second threshold related to kurtosis.

The processor 210 of the electronic device 200 that has determined whether the obtained skewness and/or kurtosis satisfies the given condition may determine whether to activate the second communication circuit 222 based on a result of a comparison at operation 790.

According to various embodiments, the electronic device 200 may determine an LoS environment and/or an NLoS environment based on the obtained skewness and/or kurtosis, may activate the second communication circuit 222, and may determine whether to transmit and receive second radio signals. For example, the electronic device 200 may determine an LoS environment by identifying that skewness is in a first range, and may activate the second communication circuit 222. In an embodiment, the electronic device 200 may determine an LoS environment by identifying a kurtosis is greater than or equal to a second threshold, and may activate the second communication circuit 222. For another example, the electronic device 200 may determine an NLoS environment by identifying that skewness is out of a first range or a kurtosis is smaller than a second threshold, and may not activate the second communication circuit 222.

In accordance with various embodiments, if the electronic device 200 is a router (or AP), it may activate the second communication circuit of an external device. For example, the AP may instruct the external device to activate the second communication circuit a basic service set (BSS) transaction management (BTM) frame exchange.

In accordance with an example embodiment, the processor 210 of the electronic device 200 that has determined that a sufficient number of the first radio signals cannot be obtained at operation 750, it may not activate the second communication circuit 222. A second radio signal having severe signal attenuation may be greatly influenced by the distance between the electronic device 200 and an external device regardless of whether they are in an LoS environment. For example, if the distance between the electronic device 200 and an external device is great, communication cannot be smoothly performed using a second radio signal. Accordingly, if a first radio signal having RSSI satisfying a given condition cannot be sufficiently obtained, performing communication based on the first radio signal using the first communication circuit 221 may be relatively smooth rather than performing communication based on a second radio signal by activating the second communication circuit 222. Accordingly, the electronic device 200 may determine that a sufficient number of first radio signals cannot be obtained, may not activate the second communication circuit 222, and may maintain communication with the external device based on the first radio signal using the first communication circuit 221.

According to various embodiments, the processor 210 of the electronic device 200 may determine the connection state of a second radio signal. For example, although the electronic device 200 has determined that the electronic device and an external device are in an LoS environment, the environment may continue to change over time (e.g., a movement of the electronic device 200). Accordingly, the electronic device 200 may continue to determine the connection state of the second radio signal. For example, the electronic device 200 may periodically check RSSI corresponding to a second radio signal received from an external device or may determine whether a second radio signal transmitted by an external device is delayed or lost. The electronic device 200 may deactivate the second communication circuit 222 based on a result of the determination of the connection state of the second radio signal, and may determine whether to activate the first communication circuit 221. For example, if the first communication circuit 221 has been activated, the electronic device 200 may perform communication with an external device using a first radio signal. If the first communication circuit 221 has been deactivated, the electronic device 200 may activate the first communication circuit 221 and perform communication with the external device using the first radio signal.

A method of controlling an electronic device supporting multi-band wireless communication according to various embodiments may include receiving at least one first radio signal through a communication channel from an external device capable of supporting omnidirectional wireless communication and directional wireless communication using a first communication circuit configured to support omnidirectional wireless communication, determining the state of the communication channel based on at least part of the at least one first radio signal, and activating a second communication circuit configured to support the directional wireless communication based on at least part of the determined state so that the second communication circuit receives a second radio signal from the external device.

In a method of controlling an electronic device supporting multi-band wireless communication according to various embodiments, the first communication circuit may be configured to support a first carrier frequency corresponding to a 2.4 GHz band or 5.0 GHz band. The second communication circuit may be configured to support a second carrier frequency corresponding to a 60 GHz band.

In a method of controlling an electronic device supporting multi-band wireless communication according to various embodiments, the operation of determining the state of the communication channel may include an operation of determining whether the electronic device and the external device are in an LoS.

In a method of controlling an electronic device supporting multi-band wireless communication according to various embodiments, the operation of activating the second communication circuit may include an operation of determining skewness or a kurtosis based on at least part of a CFR and/or CIR corresponding to the first radio signal and an operation of determining whether the skewness or kurtosis satisfies a given condition.

In a method of controlling an electronic device supporting multi-band wireless communication according to various embodiments, the at least one first radio signal includes a radio signal transmitted at a first point of time and radio signal transmitted at a second point of time by the external device. A corresponding one of the skewness and the kurtosis may be determined based on at least part of the radio signal transmitted at the first point of time and the radio signal transmitted at the second point of time.

Figure 13:
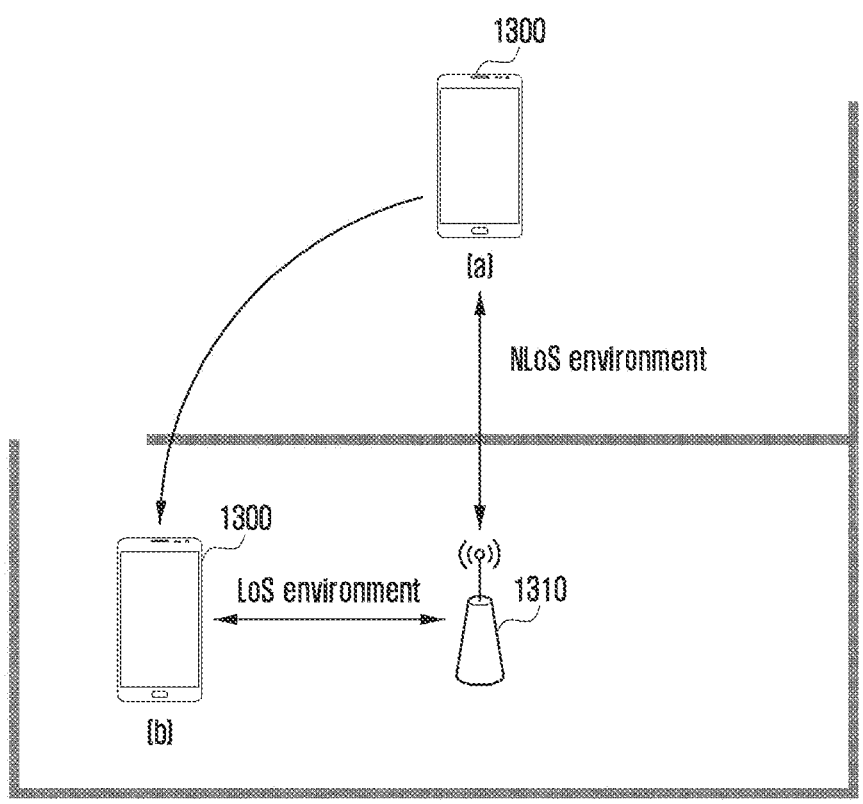
FIG. 13 is a diagram illustrating an embodiment in which an electronic device is controlled according to various embodiments.

FIG. 13 is a diagram illustrating an embodiment in which an electronic device according to various embodiments is controlled.

A location (a) shows a case where an obstacle is present between an external device 1310 (e.g., the electronic device 102, electronic device 104 or server 108 of FIG. 1) and an electronic device 1300 (e.g., the electronic device 101 of FIG. 1 or the electronic device 200 of FIG. 2). The electronic device 1300 may determine that it in an NLoS environment along with the external device according to embodiments of the present disclosure. For example, although a sufficient number of first radio signals having RSSI satisfying a given condition have been obtained, the electronic device 1300 may determine the NLoS environment based on a different state (e.g., skewness or kurtosis) and may not activate a second communication circuit (e.g., the second communication circuit 222).

If the electronic device 1300 has moved from the location (a) to a location (b), it may be in an LoS environment. For example, the electronic device 1300 may determine the LoS environment based on RSSI, skewness and a kurtosis, and may activate the second communication circuit based on the determined LoS environment.

On the other hand, if the electronic device 1300 has moved from the location (b) to the location (a) again, the electronic device 1300 may deactivate the activated second wireless communication circuit.

The electronic device 1300 according to an example embodiment may determine the state of a communication channel based on at least part of a first radio signal periodically or whenever an event (e.g., a movement of a terminal) occurs.

Figure 14:
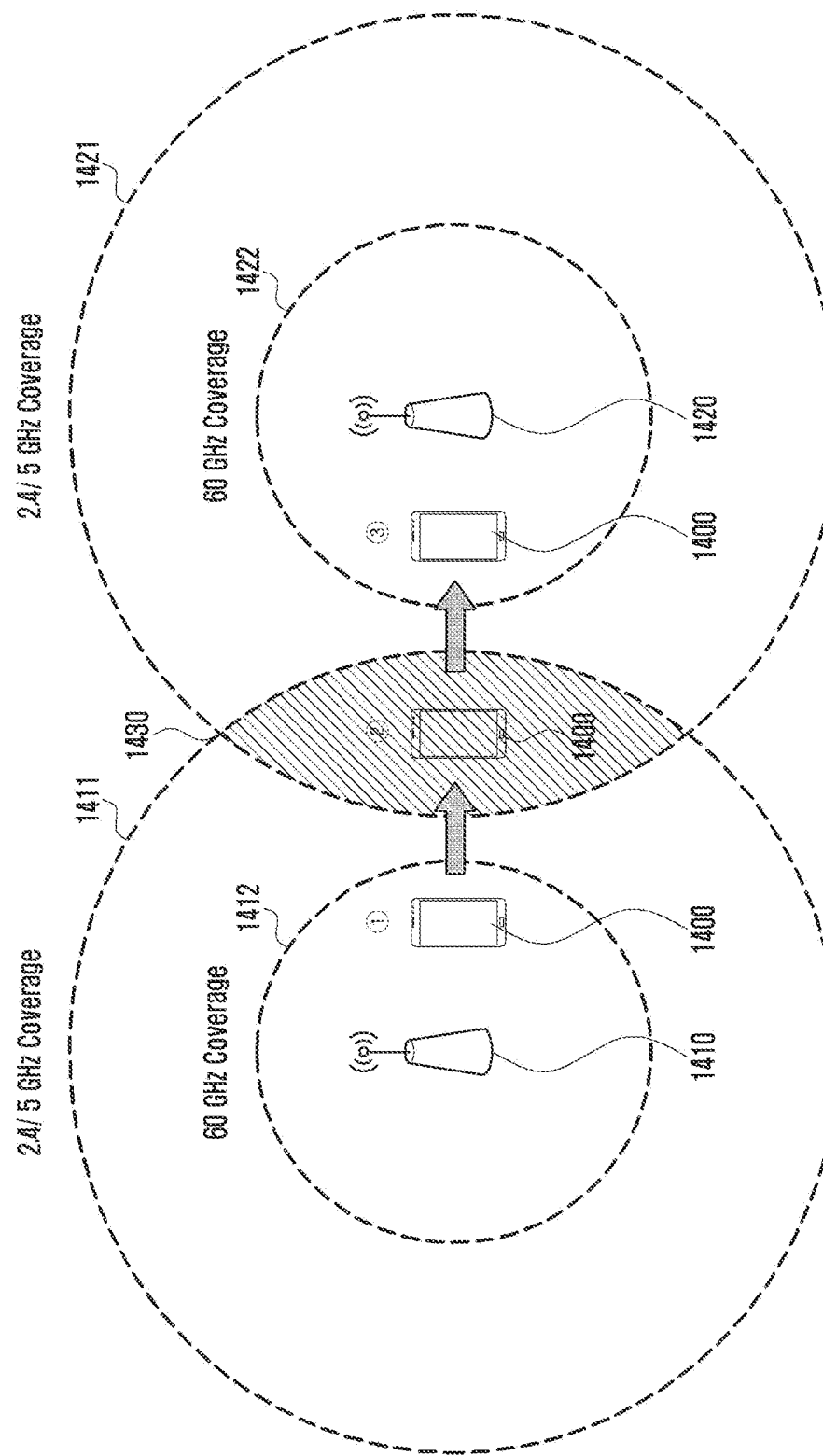
FIG. 14 is a diagram illustrating an embodiment in which an electronic device is controlled according to various embodiments.

FIG. 14 is a diagram illustrating an embodiment in which an electronic device according to various embodiments is controlled.

A first area (e.g., 1411 or 1421) may refer, for example, to an area where only first radio signals can be exchanged using a first communication band (e.g., 2.4/5 GHz communication band). A second area (e.g., 1412 or 1422) may refer, for example, to an area where second radio signals using a second communication band (e.g., 60 GHz communication band) in addition to a first radio signal using a first communication band (e.g., 2.4/5 GHz communication band) can be exchanged. For example, the first area 1411 or 1421 may refer, for example, to an area outside the second area 1412 or 1422.

For example, an electronic device 1400 (e.g., the electronic device 101 of FIG. 1 or the electronic device 200 of FIG. 2) may perform communication with a first external device 1410 using a first radio signal or second radio signal based on the first communication circuit 221 or second communication circuit 222 at a location ① within the second area 1412 of the first external device 1410 (e.g., the electronic device 102, electronic device 104 or server 108 of FIG. 1). In accordance with an example embodiment, the electronic device 1400 may move from the location ① to a location ②. For example, the electronic device 1400 in the second area 1412 of the first external device 1410 may enter the first area 1411 of the first external device 1410, may recognize that it has entered a first area 1430, and may deactivate the second communication circuit. For example, the electronic device 1400 may determine the connection state of the first radio signal or second radio signal received from the first external device 1410, and may identify that it has entered the first area 1411 of the first external device 1410. The electronic device 1400 that has deactivated the second communication circuit may perform communication with the first external device 1410 using the first radio signal through the first communication circuit at the location ②.

According to various embodiments, the location ② may be a roaming area 1430 where the electronic device 1400 can perform communication with both the first external device 1410 and a second external device 1420 (e.g., the electronic device 102, electronic device 104 or server 108 of FIG. 1). For example, the roaming area 1430 may refer, for example, an area where at least part of the first area 1411 of the first external device 1410 and at least part of the second area 1421 of the second external device 1420 partially overlap.

According to various embodiments, the electronic device 1400 may receive a first radio signal transmitted by the second external device 1420 through the first communication circuit at the location ②. For example, the electronic device 1400 that has entered the roaming area 1430 of the first external device 1410 and the second external device 1420 may receive a first radio signal (e.g., a signal of a 2.4/5 GHz communication band) transmitted by the second external device 1420. The electronic device 1400 may compare the RSSI of a first radio signal transmitted by the first external device 1410 with the RSSI of a first radio signal transmitted by the second external device 1420, and may perform roaming from the first external device 1410 to the second external device 1420 based on a predetermined roaming condition.

According to various embodiments, the electronic device 1400 may determine the state of a communication channel with the second external device 1420 based on a first radio signal transmitted by the second external device 1420 periodically or in response to the occurrence of an event. For example, the electronic device 1400 may determine the state of a communication channel with the second external device in a predetermined cycle (e.g., 1 minute, 5 minutes or 10 minutes). For another example, the electronic device 1400 may determine the state of a communication channel with the second external device 1420 whenever a first radio signal is received from the second external device 1420. For another example, the electronic device 1400 may determine the state of a communication channel with the second external device 1420 when it identifies (determines) that there is a problem in the connection state with the first external device 1410 or in response to a user request for identifying the state of a communication channel with the second external device 1420.

In accordance with an example embodiment, the electronic device 1400 may move from the location ② to a location ③. The electronic device 1400 that has moved to the location ③ within the second area 1422 of the second external device 1420 may perform communication with the second external device 1420 using a first radio signal or second radio signal through the first communication circuit or second communication circuit. In order to perform communication using the second radio signal, the electronic device 1400 may determine the state of a communication channel with the second external device 1420, and may activate the second communication circuit based on a determination of an LoS environment. Furthermore, if an NLoS environment is determined based on a determination of the state of the communication channel with the second external device 1420, the electronic device 1400 may not activate the second communication circuit.

Figure 15:
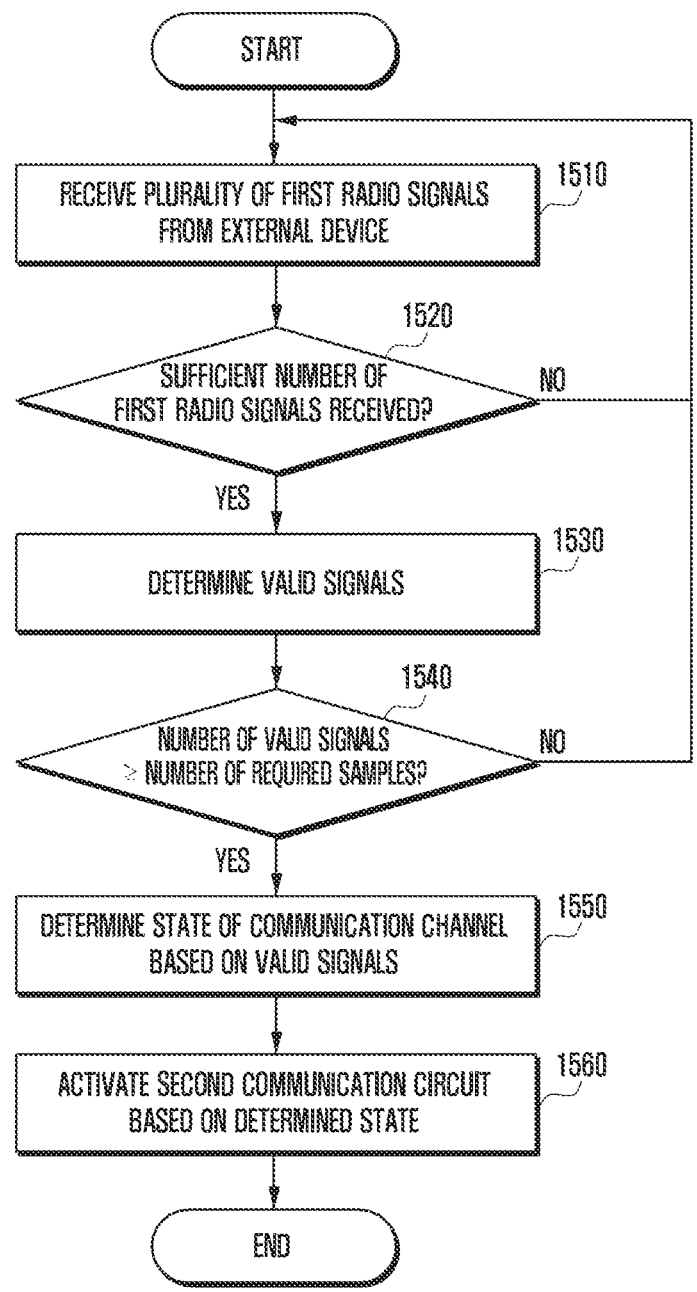
FIG. 15 is a flowchart illustrating a method of controlling an electronic device according to various embodiments.

FIG. 15 is a flowchart illustrating a method of controlling an electronic device according to various embodiments.

In accordance with various embodiments, the processor 210 of the electronic device 200 may receive a plurality of first radio signals from an external device, may select valid signals of the plurality of received first radio signals, and may determine the state of a communication channel. FIG. 15 illustrates an example of a method of selecting such valid signals and determining the state of a communication channel. In accordance with an example embodiment, the method of FIG. 15 may be performed in a one-time manner when operation 730 of FIG. 7 occurs or may be periodically performed in a predetermined cycle.

Referring to FIG. 15, at operation 1510, the processor 210 of the electronic device 200 may receive a plurality of first radio signals from an external device. The external device may transmit the plurality of first radio signals to the electronic device 200 because a specific number of samples or more are required to express the statistical characteristics of a channel in a PDF form.

At operation 1520, the processor 210 of the electronic device 200 may determine whether a sufficient number of the first radio signals have been received. The sufficient number of first radio signals may refer, for example, to the number of samples or more necessary to determine at least the LoS. In an embodiment, if a number that may be determined to be a sufficient number is previously designated and the predetermined number of first radio signals is received, it may be determined that a sufficient number of first radio signals have been received. If a sufficient number of the first radio signals have not been received, the processor 210 of the electronic device 200 may return to operation 1510 and receive one or more first radio signals from the external device.

If it is determined that a sufficient number of the first radio signals have been received at operation 1520, the processor 210 of the electronic device 200 may determine valid signals of the plurality of received first radio signals at operation 1530.

In accordance with various embodiments, if RSSI corresponding to a first radio signal satisfies a given condition, the electronic device 200 may determine the radio signal to be a valid signal. For example, the electronic device 200 may identify RSSI corresponding to each received first radio signal and determine a first radio signal having RSSI satisfying a given condition to be a valid signal. For another example, the electronic device 200 may obtain at least some of a plurality of received first radio signals, and may identify the obtained first radio signals to be valid signals depending on whether the mean RSSI of the obtained first radio signals satisfies a given condition.

At operation 1540, the processor 210 of the electronic device 200 may determine whether the number of identified valid signals is greater than or equal to the number of samples necessary to determine the LoS. For example, if it is determined that the number of valid signals is equal to or smaller than the number of required samples, the processor 210 of the electronic device 200 may return to operation 1510 and further receive one or more first radio signals from the external device.

If it is determined that the number of valid signals greater than the number of required samples has been received at operation 1540, the processor 210 of the electronic device 200 may determine the state of a communication channel based on the valid signals at operation 1550. For example, the processor 210 may determine the state of the communication channel based on the training symbols of each of the valid signals. The state of the communication channels of the valid signals may be accumulated and obtained in a PDF form. The processor 210 of the electronic device 200 may determine an LoS environment or NLoS environment based on the PDF form. Operation 1540 is substantially the same as operation 320 of FIG. 3 or operations 760 to 780 of FIG. 7, and thus a detailed description thereof is substituted with the aforementioned contents.

At operation 1560, the electronic device may activate the second communication circuit 222 based on at least part of the determined state so that the second communication circuit 222 may receive a second radio signal from the external device. Operation 1560 is substantially the same as operation 330 of FIG. 3 or operation 790 of FIG. 7, and thus a detailed description thereof is substituted with the aforementioned contents.

Figure 16:
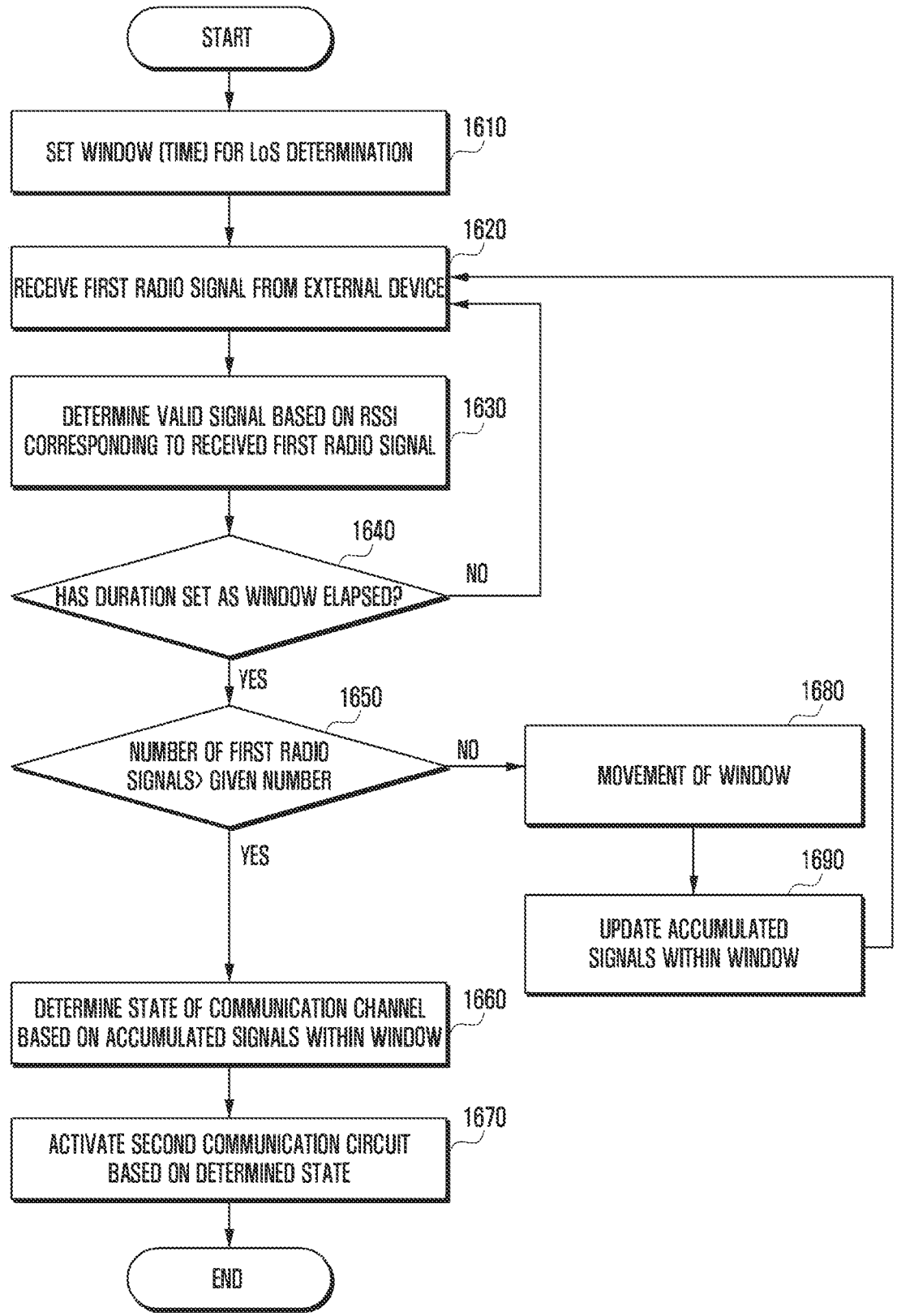
FIG. 16 is a flowchart illustrating a method of controlling an electronic device according to various embodiments.
Figure 17A:
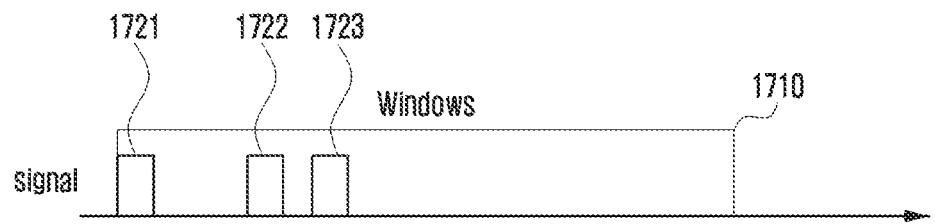
FIGS. 17A, 17B, 17C, 17D and 17E are diagrams illustrating a movement of a window according to various embodiments.
Figure 17B:
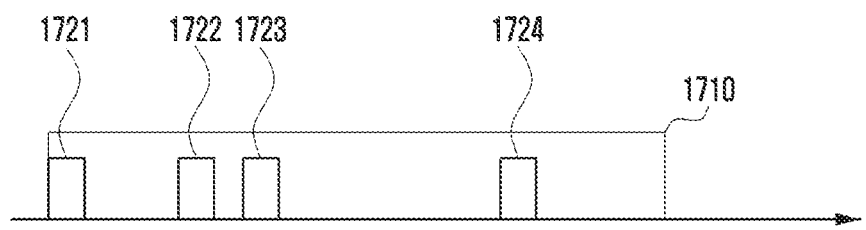
Figure 17C:
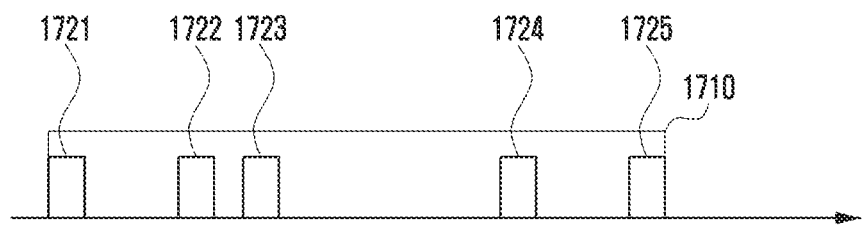
Figure 17D:
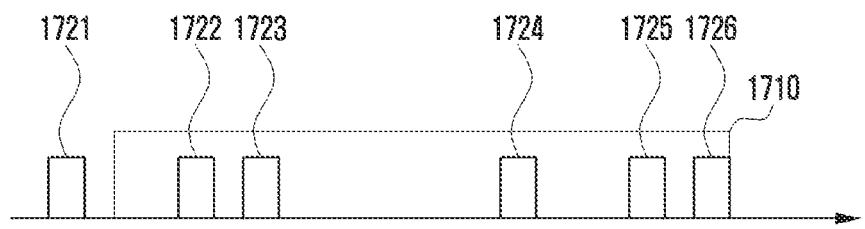
Figure 17E:
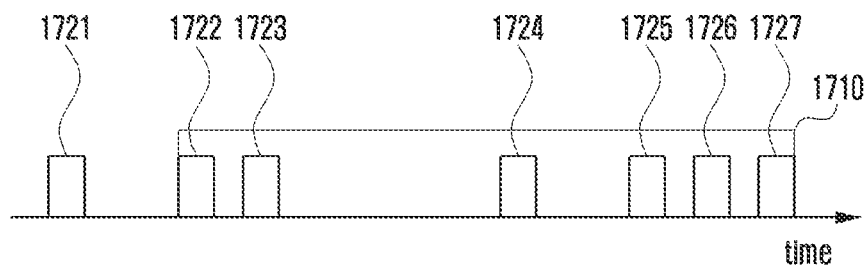

FIG. 16 is a flowchart illustrating a method of controlling an electronic device according to various embodiments.

In accordance with various embodiments, the processor 210 of the electronic device 200 may continue to determine the state of a communication channel and adaptively activate or deactivate the second communication circuit. Accordingly, FIG. 16 may be performed at various points of time. For example, FIG. 16 may refer, for example, to operations that are performed repeatedly and continuously when a movement of the electronic device 200 or external device occurs or in a predetermined cycle after it is determined that the external device supports a multi-band. For another example, the operations of FIG. 16 may be performed when operation 730 of FIG. 7 occurs. In an example embodiment, the operations of FIG. 16 may be performed after operation 790 of FIG. 7 or operation 1560 of FIG. 15.

Referring to FIG. 16, at operation 1610, the processor 210 of the electronic device 200 may set a window (time) for an LoS determination. The window (time) may be used to designate a plurality of first radio signals used to determine the state of a communication channel. For example, the window may designate a plurality of first radio signals while moving in a time axis. The first radio signals designated through the window may be used to determine the state of a communication channel. In accordance with an example embodiment, the window may be set as given duration. For example, the window may be set as given duration of 7 seconds.

At operation 1620, the processor 210 of the electronic device 200 may receive a first radio signal from an external device.

At operation 1630, the processor 210 of the electronic device 200 may determine a valid signal based on RSSI corresponding to the received first radio signal.

In accordance with various embodiments, if RSSI corresponding to a first radio signal satisfies a given condition, the electronic device 200 may determine the first radio signal to be a valid signal. For example, the electronic device 200 may previously set a first threshold (e.g., −50 dBm) and determine whether RSSI corresponding to a first radio signal is greater than or equal to the first threshold. If it is determined that the RSSI corresponding to the first radio signal is greater than or equal to the first threshold, the electronic device 200 may determine the first radio signal to be a valid signal.

At operation 1640, the processor 210 of the electronic device 200 may determine whether the duration set as the window has elapsed from a point of time at which the first radio signal was first received. For example, if the window has been set as duration of 7 seconds, whether the duration of 7 seconds has elapsed from a point of time at which a first radio signal was first received may be determined. If it is determined that the duration set as the window has not elapsed, the processor 210 of the electronic device 200 may return to operation 1620 and receive a first radio signal from the external device.

If it is determined that the duration set as the window has elapsed, at operation 1650, the processor 210 of the electronic device 200 may determine whether the number of first radio signals determined to be valid signals within the window is greater than a given number. For example, the processor 210 may determine whether the number of first radio signals determined to be valid signals within the window is greater than a number designated to determine the LoS (e.g., the number of required samples).

If it is determined that the number of first radio signals determined to be valid signals within the window is greater than the given number at operation 1650, the processor 210 of the electronic device 200 may determine the state of a communication channel based on accumulated signals within the window at operation 1660. In accordance with various embodiments, the electronic device 200 may determine the state of a communication channel based on signals determined to be valid signals. For example, since invalid signals within a window may be accumulated, the electronic device 200 may determine the state of a communication channel based on signals determined to be valid signals. Operation 1650 is substantially the same as operation 320 of FIG. 3 or operations 760 to 780 of FIG. 7, and thus a detailed description thereof is substituted with the aforementioned contents.

At operation 1670, the processor 210 of the electronic device 200 may activate the second communication circuit 222 based on at least part of the determined state so that the second communication circuit 222 can receive a second radio signal from the external device. Operation 1670 is substantially the same as operation 330 of FIG. 3 or operation 790 of FIG. 7, and thus a detailed description thereof is substituted with the aforementioned contents. Furthermore, the processor 210 of the electronic device 200 may perform operation 1620 after operation 1670. In accordance with an example embodiment, after the processor 210 of the electronic device 200 activates the second communication circuit 222, the processor may determine the state of a communication channel while continuously moving the window. For example, while the second communication circuit 222 is activated, the electronic device 200 may maintain the activation of the first communication circuit 221 and continuously determine the state of a communication channel.

If the number of first radio signals determined to be valid signals within the window is equal to or smaller than the given number at operation 1650, the processor 210 of the electronic device 200 may move the window at operation 1680. In accordance with various embodiments, the window may move in a time axis at a preset speed. For example, the processor of the electronic device 200 may increase a window by adding a given time (e.g., 1 second) based on the present time, may maintain given duration (e.g., 7 seconds) by removing a window corresponding to the given time (e.g., 1 second) from the start time of the window (e.g., time prior to 7 seconds from the present time), and may move the window.

At operation 1690, the processor 210 of the electronic device 200 may update accumulated signals within the window. For example, as a window moves, a first radio signal not located within the window may be removed from accumulated signals within the window, and a first radio signal newly located within the window may be accumulated within the window. Thereafter, the processor 210 of the electronic device 200 may perform operation 1620.

FIGS. 17A, 17B, 17C, 17D and 17E are diagrams illustrating a movement of a window according to various embodiments.

Referring to FIG. 17, a window 1710 may be set as given duration (e.g., 7 seconds) for an LoS determination. FIGS. 17A and 17B illustrate that first radio signals continue to be received from an external device, but the window is not moved because the given duration set as the window does not elapse. First radio signals (e.g., 1721, 1722, 1723 and 1724) may be randomly received, and the interval between received durations may not be regular. FIG. 17C illustrates a point of time at which the given duration set as the window elapses. The processor 210 of the electronic device 200 may determine whether the number of first radio signals determines to be valid signals within a window is greater than a given number. If it is determined that the number of first radio signals determined to be valid signals within the window is greater than the given number, the processor 210 may determine the state of a communication channel based on accumulated valid signals within the window. FIG. 17D illustrates a movement of the window. The window may move in the time axis at a preset speed. For example, the processor 210 of the electronic device 200 may increase a window by adding a given time based on the present time, and may maintain given duration by removing a window corresponding to the given time from the start time of the window, and may move the window. The first radio signal 1721 that has been removed as the window moves is not used to express the statistical characteristics of a channel. Instead, a first radio signal 1726 that has been newly added may be accumulated in the window and used to express the statistical characteristics of a channel. FIG. 17E illustrates that the window may continue to move in the time axis at a preset speed. As the window moves, a first radio signal 1727 is accumulated in the window and may be used to express the statistical characteristics of a channel. In accordance with an example embodiment, the moving speed and given duration of a window may vary in proportion to the number of received first radio signals. For example, as the number of received first radio signals increases, given duration may be decreased or moving speed may be increased.

FIGS. 18A, 18B, 18C and 18D are diagrams illustrating user interfaces according to various embodiments.

Figure 18A:
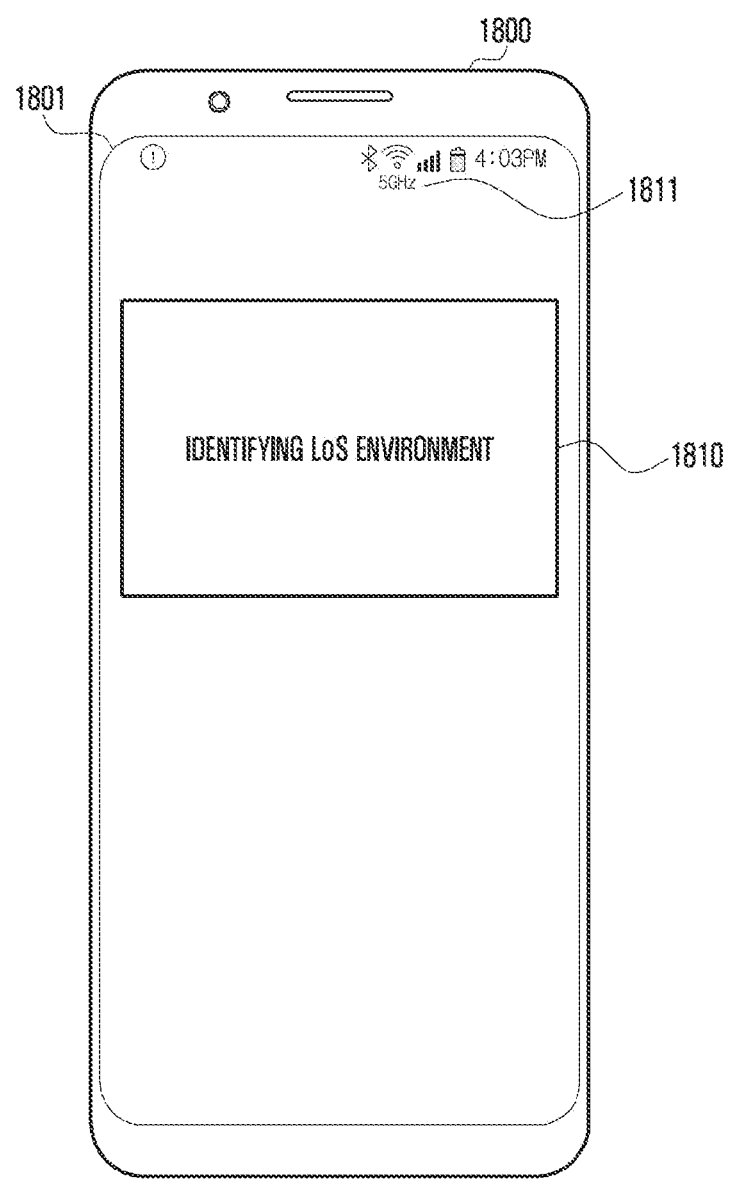
FIGS. 18A, 18B, 18C and 18D are diagrams illustrating user interfaces according to various embodiments.

FIG. 18A illustrating a user interface that may be used to notify a user that LoS/NLoS confirmation service has been triggered. In accordance with various embodiments, the LoS/NLoS confirmation service may be triggered in response to a user's command or the occurrence of a given event. The electronic device 1800 (e.g., the electronic device 101 of FIG. 1 or the electronic device 200 of FIG. 2) may display a notice 1810 on a display device 1801 (e.g., the display device 160 of FIG. 1). Furthermore, an indicator 1811 may indicate that the electronic device 1800 has now been connected to an external device through the first communication circuit 221.

Figure 18B:
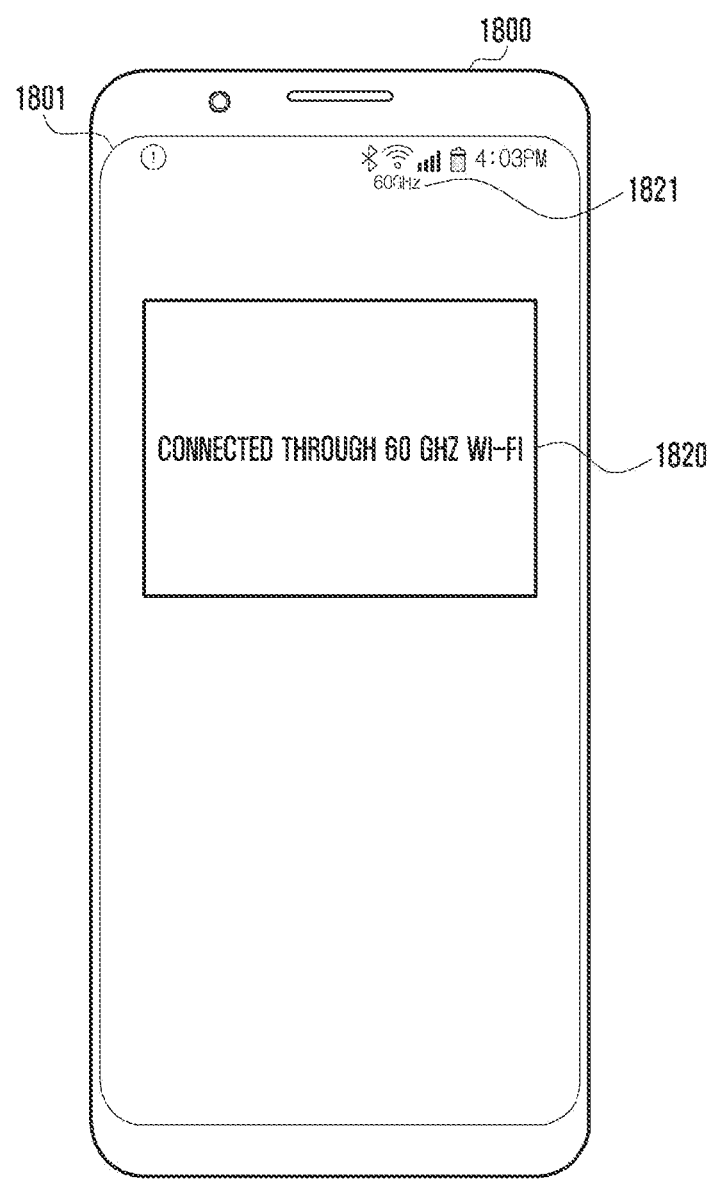

FIG. 18B illustrates a user interface that may be used to notify the user that the LoS/NLoS confirmation service has been triggered and the electronic device 1800 has been connected to the external device through a second communication circuit (e.g., the second communication circuit 222) by activating the second communication circuit using the display device 1801. In accordance with various embodiments, the electronic device 1800 may determine the state of a communication channel with the external device based on a first radio signal, and may activate the second communication circuit based on at least part of the determined state. When the second communication circuit is activated and connected to the external device, the electronic device 1800 may display a notice 1820 on the display device 1801. Furthermore, the electronic device 1800 may display that it has now been connected to the external device through the second communication circuit using an indicator 1821.

Figure 18C:
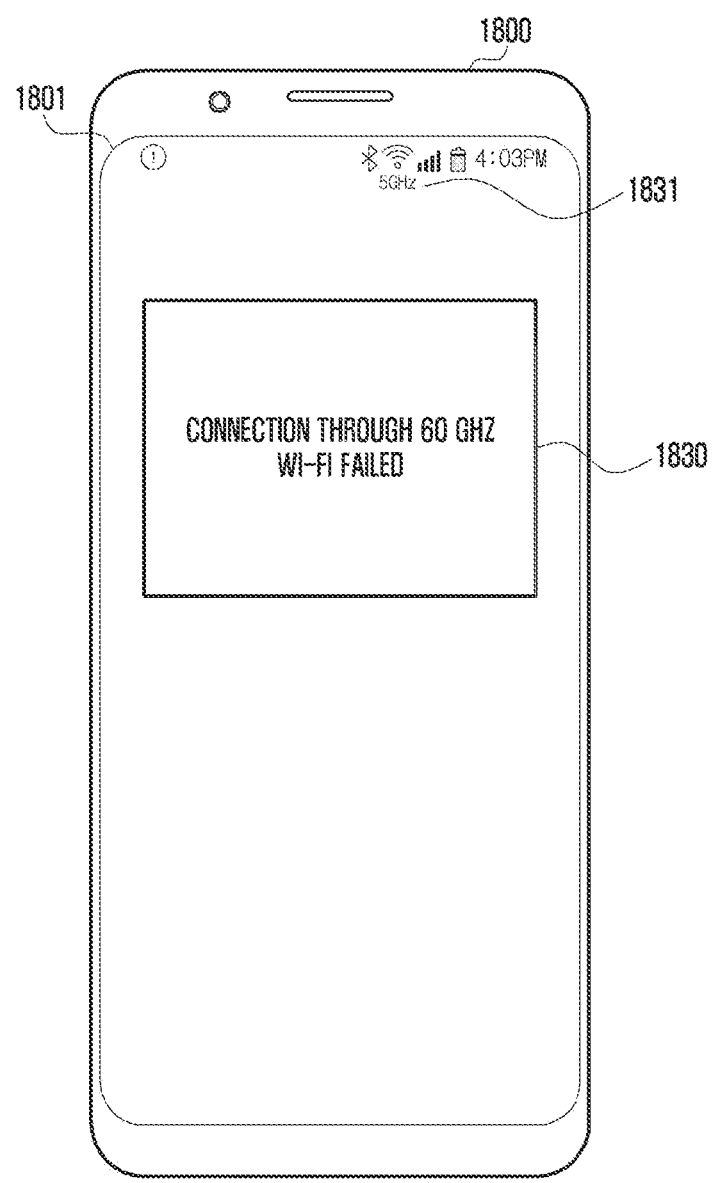

FIG. 18C illustrates a user interface that may be used to notify a user that the LoS/NLoS confirmation service has been triggered and an attempt to connect the electronic device 1800 to the external device through the second communication circuit by activating the second communication circuit has been made, but failed using the display device 1801. The electronic device 1800 may fail in the connection with the external device although the second communication circuit has been activated. The electronic device 1800 may display a notice 1830 on the display device 1801. Furthermore, the electronic device 1800 may display that it has now been connected to the external device through the first communication circuit using an indicator 1831.

Figure 18D:
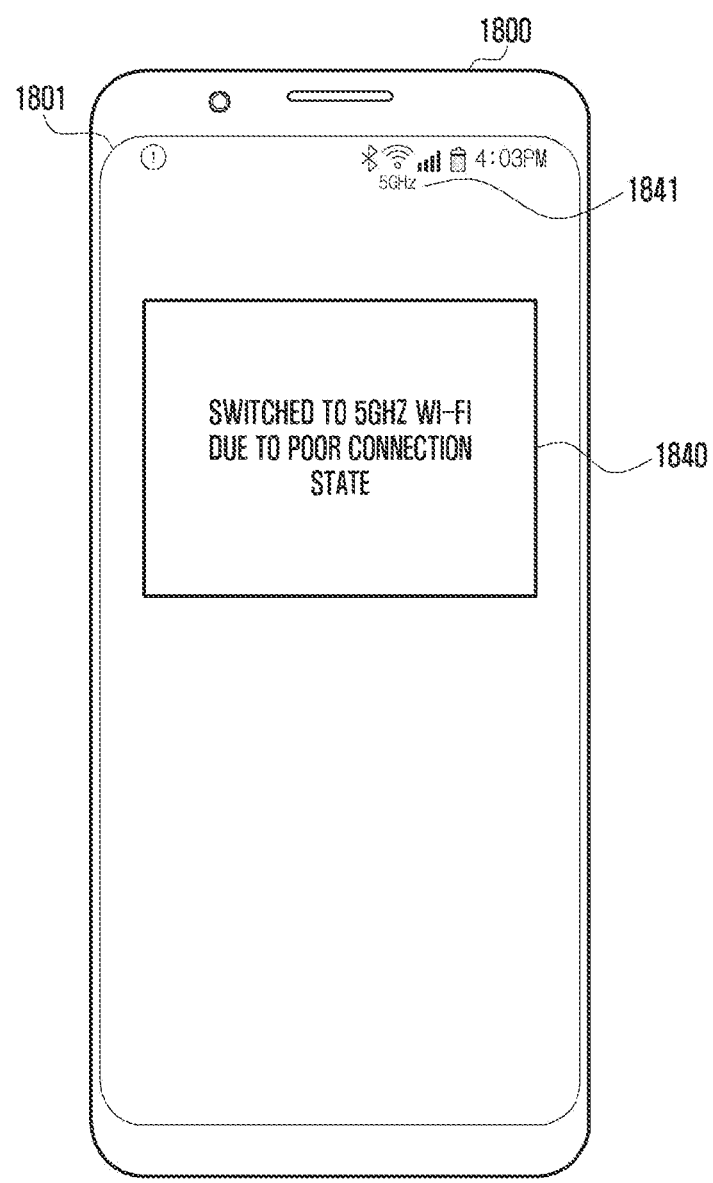

FIG. 18D illustrates a user interface that may be used to notify a user that the external device has been connected to the external device through the second communication circuit by activating the second communication circuit, but the second communication circuit has been deactivated based on a connection state. Although the electronic device 1800 has determined to be in an LoS environment along with an external device and, an environment may continue to change (e.g., a movement of the electronic device 1800) over time. Accordingly, the electronic device 1800 may determine the connection state of a second radio signal. The electronic device 1800 may determine whether to deactivate the second communication circuit and to activate the first communication circuit based on a result of the connection state of the second radio signal. The electronic device 1800 may display a notice 1840 on the display device 1801. Furthermore, the electronic device 1800 may display that it has now been connected to the external device through the first communication circuit using an indicator 1841. For another example, the electronic device 1800 may determine whether it is in the LoS along with the external device using a first radio signal, and may display a notice indicating that the second communication circuit can be activated or an indicator providing notification that the external device is in the LoS along with the external device on the display device 1801.

The electronic device supporting multi-band wireless communication according to various embodiments of the present disclosure can prevent and/or reduce unnecessary power consumption and improve reliability of communication because it activates the directional wireless communication method when sufficient received signal strength indication (RSSI) and an LoS environment are guaranteed.

Various embodiments of the present disclosure can reduce a propagation path loss when wireless communication is provided in a mmWave band because the directional wireless communication method is activated depending on whether an LoS environment is guaranteed.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an example embodiment of the disclosure, the electronic devices are not limited to those described above. It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it may mean that the element may be coupled with the other element directly (e.g., via wire), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments have been described and illustrated in the present disclosure, it will be understood that various modifications, variations and alternatives of the example embodiments fall within the scope of the present disclosure. It will be further understood that the various example embodiments are intended to be illustrative, and not limiting.

What is claimed is:

1. A portable communication device comprising:
a first communication circuit configured to support a first frequency band to be used for an omnidirectional communication;
a second communication circuit configured to support a second frequency band to be used for a directional communication; and
a processor operatively coupled with the first communication circuit and the second communication circuit, the processor configured to:
receive, using the first communication circuit, a first radio signal corresponding to the first frequency band and transmitted from an external electronic device connected to the portable communication device through the omnidirectional communication;
determine whether the received first radio signal satisfies a specified condition, wherein the specified condition is associated with information included in the received first radio signal; and
perform, using the second communication circuit, the directional communication between the portable communication device and the external electronic device via a second radio signal corresponding to the second frequency band if the received first radio signal satisfies the specified condition.

2. The portable communication device of claim 1, wherein the specified condition is whether the received first radio signal indicates that the portable communication device and the external electronic device are in a line of sight (LoS).

3. The portable communication device of claim 1, wherein the processor is configure to:
identify a channel frequency response(CFR) or a channel impulse response (CIR) associated with the received first radio signal; and
determine whether the received first radio signal satisfies the specified condition based on the identified channel frequency response or the identified channel impulse response.

4. The portable communication device of claim 3, wherein the processor is configure to:
identify a skewness or a kurtosis based at least in part on the CFR or the CIR,
determine whether the received first radio signal satisfies the specified condition based on the identified skewness or the identified kurtosis.

5. The portable communication device of claim 1, wherein the specified condition is whether a received signal strength indication (RSSI) corresponding to the received first radio signal satisfies a specified value.

6. A portable communication device comprising:
a first communication circuit configured to support a first frequency band to be used for an omnidirectional communication;
a second communication circuit configured to support a second frequency band to be used for a directional communication; and
a processor operatively coupled with the first communication circuit and the second communication circuit, the processor configured to:
receive, using the first communication circuit, a first radio signal corresponding to the first frequency band and transmitted from an external electronic device connected to the portable communication device through the omnidirectional communication;

determine whether the received first radio signal satisfies a specified condition, wherein the specified condition is associated with a moving state of the portable communication device; and perform, using the second communication circuit, the directional communication between the portable communication device and the external electronic device via a second radio signal corresponding to the second frequency band if the received first radio signal satisfies the specified condition.

7. A portable communication device comprising:

a first communication circuit configured to support a first frequency band to be used for an omnidirectional communication;

a second communication circuit configured to support a second frequency band to be used for a directional communication; and a processor operatively coupled with the first communication circuit and the second communication circuit, the processor configured to:

receive, using the first communication circuit, a first radio signal corresponding to the first frequency band and transmitted from an external electronic device connected to the portable communication device through the omnidirectional communication;

determine whether the received first radio signal satisfies a specified condition, wherein the specified condition is associated with a characteristic of the external electronic device; and perform, using the second communication circuit, the directional communication between the portable communication device and the external electronic device via a second radio signal corresponding to the second frequency band if the received first radio signal satisfies the specified condition.

8. A portable communication device comprising:

a first communication circuit configured to support a first frequency band to be used for an omnidirectional communication;

a second communication circuit configured to support a second frequency band to be used for a directional communication; and a processor operatively coupled with the first communication circuit and the second communication circuit, the processor configured to:

receive, using the first communication circuit, a first radio signal corresponding to the first frequency band and transmitted from an external electronic device connected to the portable communication device through the omnidirectional communication;

determine whether the received first radio signal satisfies a specified condition, wherein the specified condition is associated with a characteristic of content transmitted from the external electronic device; and perform, using the second communication circuit, the directional communication between the portable communication device and the external electronic device via a second radio signal corresponding to the second frequency band if the received first radio signal satisfies the specified condition.

9. The portable communication device of claim 8, wherein the characteristic of content indicates at least one of a capacity of the content, a transmission method of content, or an application.

10. A method of controlling a portable communication device supporting multi-band wireless communication, the method comprising:

receiving, using a first communication circuit, a first radio signal corresponding to a first frequency band and transmitted from an external electronic device connected to the portable communication device through an omnidirectional communication;

determining whether the received first radio signal satisfies a specified condition, wherein the specified condition is associated with information included in the received first radio signal; and performing, using a second communication circuit, a directional communication between the portable communication device and the external electronic device via a second radio signal corresponding to a second frequency band if the received first radio signal satisfies the specified condition.

11. The method of claim 10, wherein the specified condition is whether the received first radio signal indicates that the portable communication device and the external electronic device are in a line of sight (LoS).

12. The method of claim 10, further comprising:

identifying a channel frequency response(CFR) or a channel impulse response (CIR) associated with the received first radio signal; and determining whether the received first radio signal satisfies the specified condition based on the identified channel frequency response or the identified channel impulse response.

13. The method of claim 12, further comprising:

identifying a skewness or a kurtosis based at least in part on the CFR or the CIR, determining whether the received first radio signal satisfies the specified condition based on the identified skewness or the identified kurtosis.

14. The method of claim 10, wherein the specified condition is whether a received signal strength indication (RSSI) corresponding to the received first radio signal satisfies a specified value.

15. A method of controlling a portable communication device supporting multi-band wireless communication, the method comprising:

receiving, using a first communication circuit, a first radio signal corresponding to a first frequency band and transmitted from an external electronic device connected to the portable communication device through an omnidirectional communication;

determining whether the received first radio signal satisfies a specified condition, wherein the specified condition is associated with a moving state of the portable communication device; and performing, using a second communication circuit, a directional communication between the portable communication device and the external electronic device via a second radio signal corresponding to a second frequency band if the received first radio signal satisfies the specified condition.

16. A method of controlling a portable communication device supporting multi-band wireless communication, the method comprising:

receiving, using a first communication circuit, a first radio signal corresponding to a first frequency band and transmitted from an external electronic device connected to the portable communication device through an omnidirectional communication;

determining whether the received first radio signal satisfies a specified condition, wherein the specified condition is associated with a characteristic of the external electronic device; and performing, using a second communication circuit, a directional communication between the portable communication device and the external electronic device via a second radio signal corresponding to a second frequency band if the received first radio signal satisfies the specified condition.

17. A method of controlling a portable communication device supporting multi-band wireless communication, the method comprising:

receiving, using a first communication circuit, a first radio signal corresponding to a first frequency band and transmitted from an external electronic device connected to the portable communication device through an omnidirectional communication;

determining whether the received first radio signal satisfies a specified condition, wherein the specified condition is associated with a characteristic of content transmitted from the external electronic device; and performing, using a second communication circuit, a directional communication between the portable communication device and the external electronic device via a second radio signal corresponding to a second frequency band if the received first radio signal satisfies the specified condition.

18. The method of claim 17, wherein the characteristic of content indicates at least one of a capacity of the content, a transmission method of content, or an application.

* * * * *